US012499573B2

United States Patent
Thawakar et al.

(10) Patent No.: US 12,499,573 B2
(45) Date of Patent: Dec. 16, 2025

(54) SYSTEM AND METHOD FOR VIDEO INSTANCE SEGMENTATION VIA MULTI-SCALE SPATIO-TEMPORAL SPLIT ATTENTION TRANSFORMER

(71) Applicant: Mohamed bin Zayed University of Artificial Intelligence, Abu Dhabi (AE)

(72) Inventors: Omkar Thawakar, Abu Dhabi (AE); Sanath Narayan, Abu Dhabi (AE); Hisham Cholakkal, Abu Dhabi (AE); Rao Muhammad Anwer, Abu Dhabi (AE); Muhammad Haris, Abu Dhabi (AE); Salman Khan, Abu Dhabi (AE); Fahad Khan, Abu Dhabi (AE)

(73) Assignee: Mohamed Bin Zayed University of Artificial Intelligence, Abu Dhabi (AE)

( * ) Notice: Subject to any disclaimer, the term of this patent is extended or adjusted under 35 U.S.C. 154(b) by 391 days.

(21) Appl. No.: 17/983,841

(22) Filed: Nov. 9, 2022

(65) Prior Publication Data
US 2024/0161334 A1 May 16, 2024

(51) Int. Cl.
*G06T 7/73* (2017.01)
*G06V 10/26* (2022.01)
(Continued)

(52) U.S. Cl.
CPC .............. *G06T 7/73* (2017.01); *G06V 10/26* (2022.01); *G06V 10/7715* (2022.01);
(Continued)

(58) Field of Classification Search
CPC ............ G06T 7/73; G06T 2207/30196; G06T 2207/30261; G06V 10/26; G06V 10/7715;
(Continued)

(56) References Cited

U.S. PATENT DOCUMENTS 12,112,538 B2 * 10/2024 Arnab ................. G06N 3/0464
2023/0290135 A1 * 9/2023 Zhou ..................... G06V 10/82
(Continued)

FOREIGN PATENT DOCUMENTS

CN 112990356 B 8/2021

OTHER PUBLICATIONS

W. Zhang, X. He, X. Yu, W. Lu, Z. Zha and Q. Tian, "A Multi-Scale Spatial-Temporal Attention Model for Person Re-Identification in Videos," in IEEE Transactions on Image Processing, vol. 29, pp. 3365-3373, 2020, doi: 10.1109/TIP.2019.2959653. (Year: 2020).*
(Continued)

*Primary Examiner* — Chan S Park
*Assistant Examiner* — Paulo Andres Garcia
(74) *Attorney, Agent, or Firm* — Oblon, McClelland, Maier & Neustadt, L.L.P.

(57) ABSTRACT

A system, method, computer readable storage medium for a computer vision system includes at least one video camera, and video processor circuitry. The method includes inputting a stream of video data and generating a sequence of image frames, segmenting and tracking, by the video analysis apparatus, object instances in the stream of video data, including receiving the sequence of image frames, analyzing the sequence of image frames using a video instance segmentation transformer to obtain a video instance mask sequence from the sequence of image frames, the transformer having a backbone network, a transformer encoder-decoder, and an instance matching and segmentation block, The encoder contains a multi-scale spatio-temporal split attention module to capture spatio-temporal feature relationships at multiple scales across multiple frames. The decoder contains a temporal attention block for enhancing a temporal consistency of transformer queries. The method includes displaying the video instance mask sequence.

20 Claims, 19 Drawing Sheets

(51) Int. Cl.
  *G06V 10/77* (2022.01)
  *G06V 10/774* (2022.01)
  *G06V 10/94* (2022.01)
  *G06V 20/58* (2022.01)
(52) U.S. Cl.
  CPC ............ *G06V 10/774* (2022.01); *G06V 10/95* (2022.01); *G06V 20/582* (2022.01); *G06T 2207/30196* (2013.01); *G06T 2207/30261* (2013.01)
(58) Field of Classification Search
  CPC .... G06V 10/774; G06V 10/95; G06V 10/582; G06V 10/25; G06V 10/454; G06V 10/62; G06V 10/764; G06V 10/58; G06V 10/82
  See application file for complete search history.

(56) References Cited

U.S. PATENT DOCUMENTS

| | | | |
|---|---|---|---|
| 2024/0005663 A1* | 1/2024 | Lee | G06F 16/784 |
| 2024/0071064 A1* | 2/2024 | Chung | G06V 20/58 |
| 2024/0312194 A1* | 9/2024 | Li | G06V 10/764 |

OTHER PUBLICATIONS

Bertasius et al., "Object Detection in Video with Spatiotemporal Sampling Networks", Computer Vision â ECCV 2018: 15th Euro. Conf., Sep. 8â14, 2018, Part XII, p. 342â357, doi: 10.1007/978-3-030-01258-8_21 (Year: 2018).*

C. R. Chen, Q. Fan and R. Panda, "CrossViT: Cross-Attention Multi-Scale Vision Transformer for Image Classification," in 2021 IEEE/CVF International Conference on Computer Vision (ICCV), Montreal, QC, Canada, 2021, pp. 347-356, doi: 10.1109/ICCV48922.2021.00041. (Year: 2021).*

Zhang et al., "I2Net: Mining intra-video and inter-video attention for temporal action localization", Neurocomputing, vol. 444, 2021, p. 16-29, doi: https://doi.org/10.1016/j.neucom.2021.02.085. (Year: 2021).*

Isola et al., "Image-to-Image Translation with Conditional Adversarial Networks", 2018, https://doi.org/10.48550/arXiv.1611.07004 (Year: 2018).*

Li et al., "Locality-Aware Inter-and Intra-Video Reconstruction for Self-Supervised Correspondence Learning", 2022, https://doi.org/10.48550/arXiv.2203.14333 (Year: 2022).*

Liang et al., "Learning Intra-inter Semantic Aggregation for Video Object Detection", Proceedings of the 2nd ACM ICMAsia, article 20, 2021, doi: 10.1145/3444685.3446273 (Year: 2021).*

Mao et al, "Generative Transformer for Accurate and Reliable Salient Object Detection", Journal of Latex Class Files, vol. 14, No. 8, Aug. 2021, DOI 10.1109/TCSVT.2024.3469286 (Year: 2021).*

Wang et al, "MT-STNets: Multi-Task Spatial-Temporal Networks for Multi-Scale Traffic Prediction", Proceedings of the 2021 SIAM International Conference on Data Mining (SDM). 2021, 504-512 (Year: 2021).*

Xizhou Zhu and Weijie Su and Lewei Lu and Bin Li and Xiaogang Wang and Jifeng Dai, Deformable DETR: Deformable Transformers for End-to-End Object Detection, 2021, https://arxiv.org/abs/2010.04159 (Year: 2021).*

Adria Caelles and Tim Meinhardt and Guillem Braso and Laura Leal-Taixe, DeVIS: Making Deformable Transformers Work for Video Instance Segmentation, Jul. 22, 2022, https://arxiv.org/abs/2207.11103, https://doi.org/10.48550/arXiv.2207.11103 (Year: 2022).*

Sudhir Yarram and Jialian Wu and Pan Ji and Yi Xu and Junsong Yuan, Deformable VisTR: Spatio temporal deformable attention for video instance segmentation, Mar. 12, 2022, https://arxiv.org/abs/2203.06318, https://doi.org/10.48550/arXiv.2203.06318 (Year: 2022).*

Xiao, et al. ; Space-time super-resolution for satellite video: A joint framework based on multi-scale spatial-temporal transformer ; International Journal of Applied Earth Observations and Geoinformation 108 ; Feb. 19, 2022 ; 11 Pages.

Yang, et al. ; STA-TSN: Spatial-Temporal Attention Temporal Segment Network for action recognition in video ; PLOS ONE 17(3) ; Mar. 17, 2022 ; 19 Pages.

Wang, et al. ; End-to-End Video Instance Segmentation with Transformers ; University of Adelaide ; Oct. 8, 2021 ; 10 Pages.

* cited by examiner

SYSTEM AND METHOD FOR VIDEO INSTANCE SEGMENTATION VIA MULTI-SCALE SPATIO-TEMPORAL SPLIT ATTENTION TRANSFORMER

STATEMENT REGARDING PRIOR DISCLOSURE BY THE INVENTORS

Aspects of this technology are described in Thawakar Omkar, Sanath Narayan, Jiale Cao, Hisham Cholakkal, Rao Muhammad Anwer, Muhammad Haris Khan, Salman Khan, Michael Felsberg, and Fahad Shahbaz Khan, "Video Instance Segmentation via Multi-scale Spatio-temporal Split Attention Transformer," arXiv preprint arXiv:2203.13253 (2022), and is incorporated herein by reference in its entirety.

BACKGROUND

Technical Field

The present disclosure is directed to a video instance segmentation system and method that uses a transformer for simultaneously segmenting and tracking multiple object instances from a set of categories, and in particular a video instance segmentation system in a vehicle computer vision system that tracks object instances along its path.

Description of the Related Art

Computer vision is a set of techniques used to interpret image-based data by computers. Recently, computer vision using artificial neural networks has extended the capabilities of computers to understand the context of a scene and filter out background noise. However, there is still much room for improvement. For example, computers that use artificial neural networks lack the perceptive skills of a human driver that would be required in an autonomous vehicle.

Computer vision in an automotive context must do much more that tell the difference between a car and a human, or a tree and a building. Object recognition needs to be done in a real-time environment. The input from a video camera is based on a set of lines that are constantly flowing from the image sensor which constitute an ever-changing image. Subsequently, there is a need to recognize objects based on partial images. There are multiple elements in an environment that can be confusing for computer vision system. For example, a computer vision system may encounter an image of a vehicle on a roadside billboard.

Computer vision in an automotive context may encounter traffic signs. The challenge in traffic sign recognition is that it must be performed quickly and in a highly volatile environment. A sign can be dirty, covered by leaves, twisted into an odd angle, or modified in this or another way. Also, signs may be temporary, for example, signs about a detour or road construction.

Computer vision in an automotive context must recognize pedestrians, and understand pedestrian motion. The computer vision system needs to not only recognize a pedestrian but also needs to be able to estimate the pedestrian's expected motion. If the pedestrian's motion indicates that he or she is going to cross the road, the computer vision system needs to spot that and react quickly. Furthermore, the computer vision system needs to not only predict movement but also to anticipate behavior. For example, a human driver is often more careful when driving near cyclists than when driving along with other cars. Any incident would be more dangerous for a person on a bicycle. A computer vision system needs to evaluate such risk.

When tracking an object, the computer vision system needs to deal with changes in the background. Changes in background can include events where other vehicles are approaching, conditions where the road changes color or there are trees instead of fields behind it. This is not a problem for a human driver, but it can be challenging for a neural network. Also, the computer vision system can be inundated by several factors like unusual lighting conditions or weather.

Semantic segmentation and semantic instance segmentation are other problems that a computer vision system must deal with, especially in the context of automated vehicles. Semantic segmentation is about detecting multiple entities in one image and providing each one with a separate label. Semantic segmentation can handle a car, a road sign, a biker, and a truck on the road at the same time.

Semantic instance segmentation is about recognizing the difference between each object in a scene. In the instant disclosure video instance segmentation and semantic instance segmentation are used interchangeably. For an autonomous vehicle system, it is not enough that there are simply three cars on the road. The autonomous vehicle needs to be able to distinguish between them in order to track their individual behavior. While semantic segmentation segments all car, trees and pedestrians at once, instance segmentation labels each car as car1, car2 and each tree as tree1, tree2 etc.

In autonomous driving a vehicle video camera must track the road as well as stationary objects in the vicinity of the road and moving objects. When the vehicle is moving, even stationary objects appear as different sizes and distances in a video sequence. The vehicle video camera can encounter a large variety of traffic signals and objects that must be segmented and tracked. When the vehicle is on a road, the vehicle video camera captures a video sequence that includes close and distant views of the road, road markings, such as the center road line, shoulder road line, and road crossings. The video sequence can include road signs, such as stop signs and yield signs, that indicate a control requirement such as vehicle slow and stop. The video sequence can include traffic lights that also indicate a control requirement such as vehicle slow and stop. The video sequence can include signs for providing information, such as speed limit signs, dead end road, railroad crossing, an upcoming stop sign, road crossing, dangerous curves. The video sequence may include other information providing signs such as distances to locations along the road, location names, street signs, advertisements, to name a few.

The video sequence may include stationary objects along the road, or even some objects that are in the road. Objects that are along the road can include trees, bushes, guide rails, sidewalks, hills, rocks, to name a few. The video sequence may include movable objects, such as parked vehicles.

The video sequence may include moving objects, such as a person walking along the road, or crossing the road, a person riding a bicycle or scooter, an animal, such as a deer, dog or squirrel. Moving objects can include other vehicles or trains. The movement speed of moving objects is different in a video sequence when the vehicle is moving.

In all cases the vehicle video camera must be able to segment and track the objects, provided variations in size of an object, changes in aspect-ratio, and fast motion, as well as an obstructed view of an object. Accordingly, video instance segmentation (VIS) is particularly challenging since the target object needs to be accurately segmented and tracked despite appearance deformations due to several real-world issues such as, target size variation, aspect-ratio change and fast motion.

Recently, transformers have shown promising results on several vision tasks, including video instance segmentation (VIS). See Vaswani, A., Shazeer, N., Parmar, N., Uszkoreit, J., Jones, L., Gomez, A., Kaiser, L., Polosukhin, I.: Attention is all you need. In: NeurIPS (2017); Wang, Y., Xu, Z., Wang, X., Shen, C., Cheng, B., Shen, H., Xia, H.: End-to-end video instance segmentation with transformers. In: CVPR (2021); and Wu, J., Jiang, Y., Zhang, W., Bai, X., Bai, S.: Seqformer: a frustratingly simple model for video instance segmentation. In: ECCV (2022), each incorporated herein by reference in their entirety. The recent transformer-based VIS approaches are built on Detection Transformer (DETR) and Deformable DETR frameworks, utilizing an encoder-decoder architecture along with instance sequence matching and segmentation mechanisms to generate final video mask predictions. See Wang et al.; Wu et al.; Carion, N., Massa, F., Synnaeve, G., Usunier, N., Kirillov, A., Zagoruyko, S.: End-to-end object detection with transformers. In: ECCV (2020); and Zhu, X., Su, W., Lu, L., Li, B., Wang, X., Dai, J.: Deformable detr: Deformable transformers for end-to-end object detection. In: ICLR (2021), each incorporated herein by reference in their entirety. These approaches typically employ either single-scale spatio-temporal features or per-frame multi-scale features during attention computations at the encoder and decoder. See Wang et al. and Wu et al. However, such an attention computation ignores the multi-scale spatiotemporal feature relationships, which are crucial towards handling target appearance deformations due to real-world challenges such as, scale variation, change in aspect-ratio and fast motion in videos.

Accordingly it is one object of the present disclosure to provide a video instance segmentation approach that captures spatio-temporal feature relationships at multiple scales across frames in a video. The video instance segmentation approach includes an auxiliary discriminator to improve foreground-background separability within the multi-scale spatio-temporal feature space.

SUMMARY

An aspect is a vehicle computer vision system, that can include at least one video camera mounted on a vehicle to capture a stream of video data; video processor circuitry configured to input the stream of video data and generating a sequence of image frames; segment and track object instances in the stream of video data, including receiving the sequence of image frames; obtaining a video instance mask sequence from the sequence of image frames, via a video instance segmentation transformer having a backbone network, a transformer encoder-decoder, and an instance matching and segmentation block, in which the encoder contains a multi-scale spatio-temporal split (MS-STS) attention module to capture spatio-temporal feature relationships at multiple scales across multiple frames of the sequence of image frames; in which the decoder contains a temporal attention block for enhancing a temporal consistency of transformer queries; and to display a sequence of mask instances.

A further aspect is a non-transitory computer-readable storage medium storing computer program instructions, which when executed in a vehicle computer vision system, the vehicle computer vision system comprising at least one video camera mounted on a vehicle, and video processor circuitry, perform a method including inputting a stream of video data and generating a sequence of image frames; segmenting and tracking, by the video processor circuitry, object instances in the stream of video data, including receiving the sequence of image frames; analyzing the sequence of image frames using a video instance segmentation transformer to obtain a video instance mask sequence from the sequence of image frames, the transformer having a backbone network, a transformer encoder-decoder, and an instance matching and segmentation block, in which the encoder contains a multi-scale spatio-temporal split (MS-STS) attention module to capture spatio-temporal feature relationships at multiple scales across multiple frames; in which the decoder contains a temporal attention block for enhancing a temporal consistency of transformer queries; and displaying the video instance mask sequence.

A further aspect is a method for a vehicle computer vision system, the vehicle computer vision system comprising at least one video camera mounted on a vehicle, and video processor circuitry, the method including inputting a stream of video data and generating a sequence of image frames; segmenting and tracking, by the video processor circuitry, object instances in the stream of video data, including receiving the sequence of image frames; analyzing the sequence of image frames using a video instance segmentation transformer to obtain a video instance mask sequence from the sequence of image frames, having a backbone network, a transformer encoder-decoder, and an instance matching and segmentation block, in which the encoder contains a multi-scale spatio-temporal split (MS-STS) attention module to capture spatio-temporal feature relationships at multiple scales across multiple frames; in which the decoder contains a temporal attention block for enhancing a temporal consistency of instance queries; and an instance matching and segmentation block to segment the video instance mask sequence.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
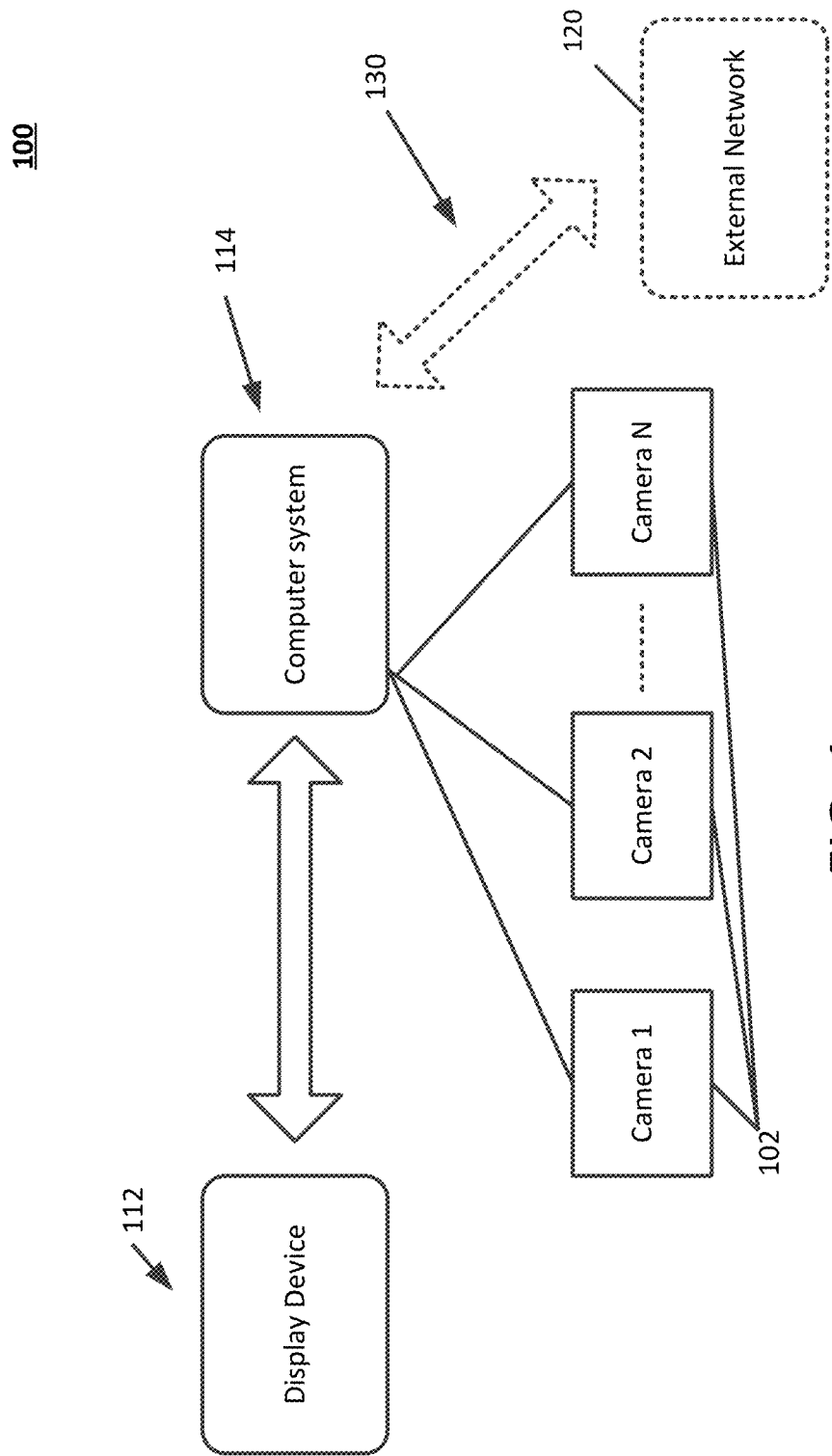
FIG. 1 is a non-limiting exemplary video analysis system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Disclosed embodiments relate to video instance segmentation, as applied to video analysis and autonomous driving. One or more video cameras capture a continuous video sequence and simultaneously segment and track all object instances from a set of semantic categories. The target objects are accurately segmented and tracked despite appearance deformations, especially in the case of size variation, aspect-ratio change, and fast motion.

FIG. 1 is a non-limiting exemplary video analysis system. A video analysis system 100 includes at least one video camera 102 connected to a computer system or computer network 114. The computer system or computer network 114 includes a display device 112. The video camera 102, computer system 114, and display device 112 may all be components of a single unit. Alternatively, the video camera 102 and computer system 114 may be components of a single unit, while the display device 112 is an optional/connectable external component. Still further, the computer system 114 and display device 112 may be an integrated device. In some embodiments, the computer system 114 may be a computing device that can be connected to video cameras 102 and a display device 112 to control the video cameras 102 and display device 112. The video cameras 102 may be the same or different camera type and may be connected to the computer system 114 via a wireless or wired connection.

Figure 2:
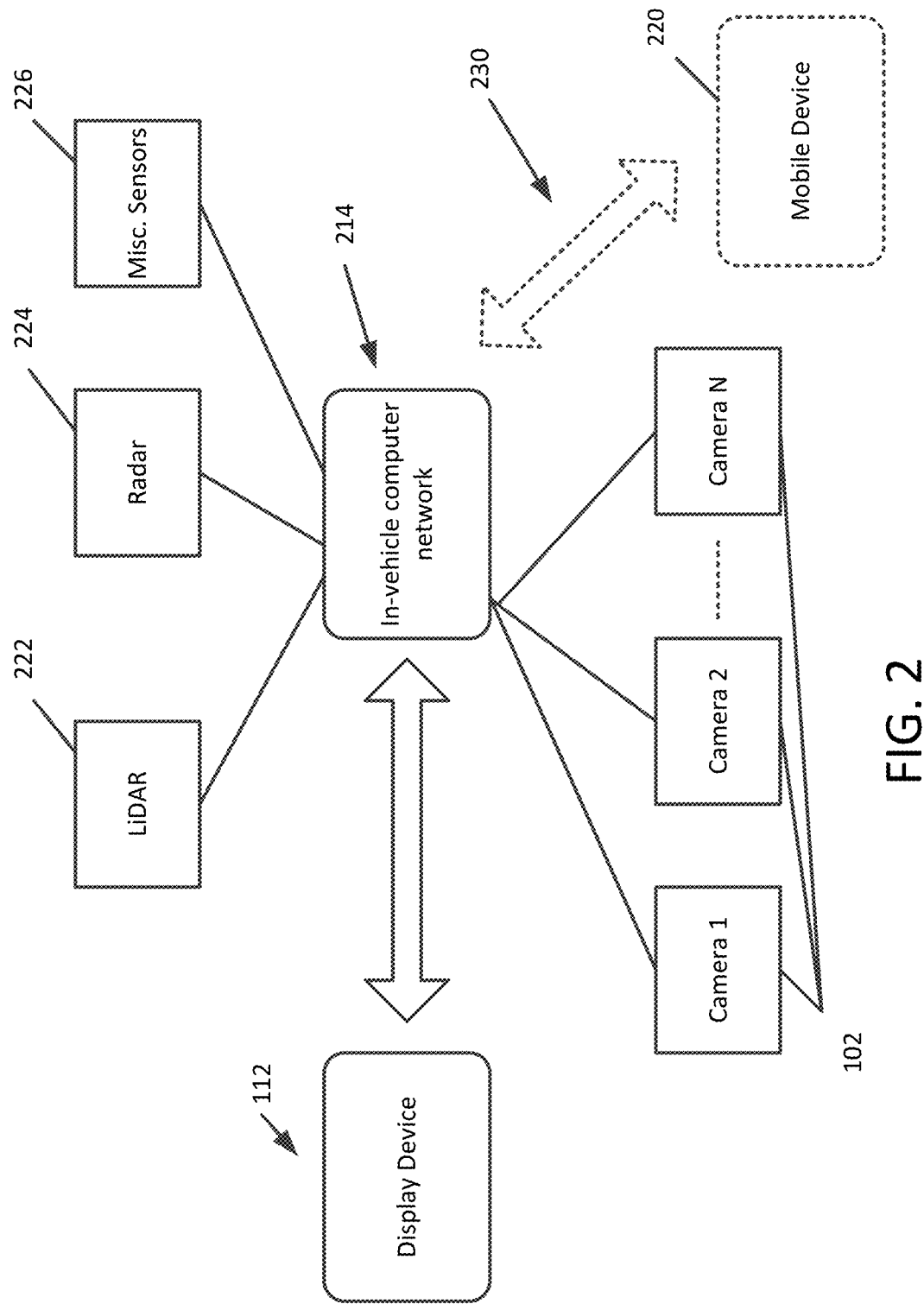
FIG. 2 is non-limiting exemplary computer vision system in the context of a vehicle.

FIG. 2 is non-limiting exemplary computer vision system in the context of a vehicle. The vehicle can have camera-based driver assistance and various levels of automated driving, including partial automation, conditional automation, high automation, and full automation. These levels of automated driving have been established to classify vehicles according to the extent of control attributed to the vehicle and the remaining driver control. In most cases, a driver may override an automated vehicle function. However, a vehicle equipped with full automation may not include driver override. Driver assistance can include emergency braking, lane assistance, traffic alert, and object detection. Some driver assistance functions may not be overridden by a driver, especially in the case of an imminent emergency condition. Automated driving is implemented as sub-systems for automatic parking, emergency steering, in-city auto-pilot driving, as well as full automation.

Regarding FIG. 2, an in-vehicle computer network 214 controls various sub-systems throughout the vehicle. An autonomous vehicle typically includes one or more sensors for assessing the surrounding environment. The one or more sensors can include radar 224 and various electrical sensors 226. In some autonomous vehicles, a LiDAR 222 may be used as a sensor for 3D vision. A vehicle may include one or more video cameras 102, on one side or multiple sides of the vehicle body. Cameras may also be mounted at other locations, including the vehicle roof, adjacent to a windshield, inside the vehicle facing through a window, to name a few. The in-vehicle computer network 214 may connect to one or more display devices 112 or other input-output connections for connection to a mobile device 220. A connection to a mobile device 220 may be by way of a wired connection port, such as USB port, or by way of a wireless connection, such as Bluetooth or WiFi.

Video cameras 102 in a vehicle may be configured to capture continuous video for storage and/or display. In some embodiments, the video sequence captured by a video camera 102 is sent directly to video processing circuitry. Video processing circuitry of disclosed embodiments can include conventional video processing circuitry that takes a stream of video data obtained by the sensor of a video camera 102 and generates a sequence of image frames. The output of the video processing circuitry is sent to processing circuitry for a machine learning model, and can include a graphics processing unit (GPU) module or a special purpose machine learning processing engine. An example GPU module is an NVIDIA GPU card. Specialized machine learning engines are presently available from Qualcomm (e.g., Snapdragon processing system), Apple (e.g., A15 or greater; M2 or greater processing SoC), and Nvidia DRIVE. The video camera 102 is configured with an image sensor and one or more lens types. The video camera can capture low resolution image frames of 480 pixels or higher, medium resolution image frames of 720 pixels, or higher resolution images of 1080 pixels or higher.

In order to handle target appearance deformations due to challenges such as, scale variation, change in aspect-ratio and fast motion in videos, a solution is the disclosed transformer-based video instance segmentation architecture that can capture multi-scale spatio-temporal feature relationships in a video. The multi-scale spatio-temporal attention mechanism learns to aggregate the necessary attentions performed along the spatial and temporal axes without losing crucial information related to target appearance deformations in both the spatial and temporal axes. In addition to target appearance deformations, video instance segmentation accurately delineates the target object in the presence of cluttered background.

Conventional transformer-based VIS approaches do not employ an explicit mechanism to enforce foreground-background (fg-bg) separability. The disclosed transformer-based video instance segmentation architecture is trained with a loss formulation that improves fg-bg separability by emphasizing the fg regions in multi-scale spatio-temporal features while simultaneously suppressing the bg regions.

A conventional video instance segmentation transformer, SeqFormer, decomposes the shared instance query into frame-level box queries for the attention mechanism to guarantee that the attention focuses on the same instance on each frame. The box queries are kept on each frame and used to predict the bounding box sequences. Then the features within the bounding boxes are aggregated to refine the box queries on the current frame. By repeating this refinement through decoder layers, SeqFormer locates the instance in each frame in a coarse-to-fine manner, in a similar way to Deformable DETR.

In one embodiment, the video instance segmentation transformer architecture uses the SeqFormer video instance segmentation transformer as a baseline in order to demonstrate superior performance. The SeqFormer framework independently utilizes per-frame multi-scale features during attention computations. As a result, it ignores the spatio-temporal feature relationships during attention computation that is crucial for the video instance segmentation problem. Different from SeqFormer that utilizes per-frame spatial features at multiple scales, the present approach performs multi-scale spatio-temporal attention computation. Such a multi-scale spatio-temporal attention is especially desired in cases when the target object undergoes appearance deformations due to challenges such as, scale variation, aspect-ratio change and fast motion in videos. Furthermore, distinct from SeqFormer, the present approach employs an explicit mechanism to ensure accurate delineation of foreground objects from the cluttered background by enhancing fg-bg separability.

Figure 3A:
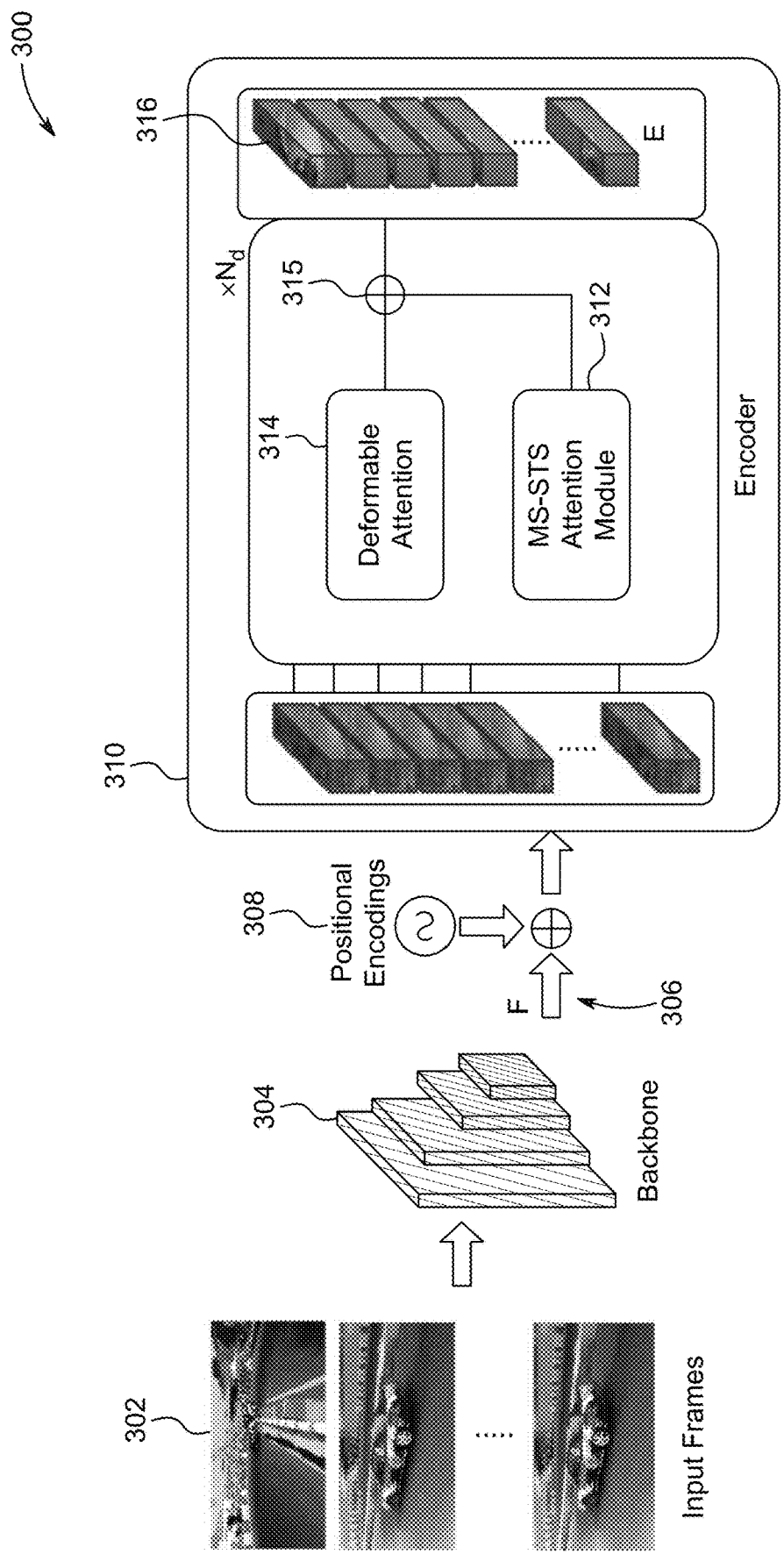
FIGS. 3A, 3B is a block diagram of a video instance segmentation transformer architecture, in accordance with an exemplary aspect of the disclosure.
Figure 3B:
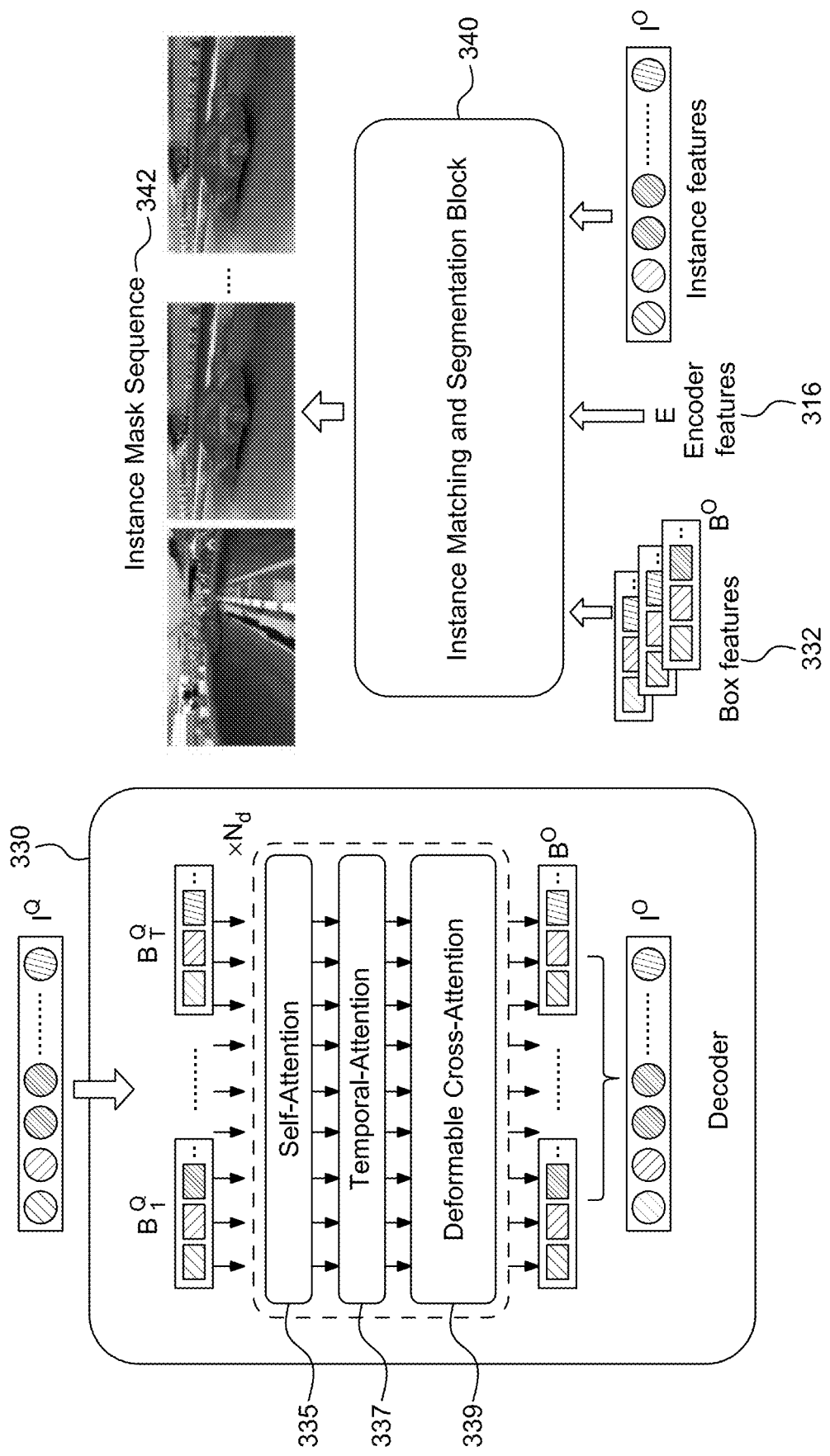

FIGS. 3A, 3B is a block diagram of a video instance segmentation transformer architecture, in accordance with an exemplary aspect of the disclosure. A video clip x consisting T frames 302 of spatial size $H^0 \times W^0$ with a set of object instances is input to the backbone network 304. Latent feature maps for each frame are obtained from the backbone 304 at L multiple scales $2^{-l-2}$ with $1 \leq l \leq L$ and passed through separate convolution filters for each scale. The output feature dimension for each of these convolution filters is set to C. The resulting multi-scale feature maps of each frame are then input to a transformer encoder comprising multi-scale deformable attention blocks 314.

In the conventional SeqFormer, for each frame, the transformer encoder outputs multi-scale feature maps with the same size as its input. These encoder output features maps from each frame along with n learnable instance query embeddings $I^Q \in \mathbb{R}^C$ are then input to the transformer decoder comprising a series of self- and cross-attention blocks. The n instance queries are further decomposed into n box queries $B^Q$ per-frame and are used to query the box features from the encoder feature maps of the corresponding frame. The learned box queries across T frames are then aggregated temporally to obtain n instance features $I^O \in \mathbb{R}^C$. These instance features output by the decoder are then used for video instance mask prediction.

The multi-scale spatio-temporal split (MS-STS) VIS 300 receives the sequence of video frames 302 as input frames and includes a backbone network 304, a transformer encoder-decoder 310, 330 and an instance matching and segmentation block 340. The VIS 300 includes: (i) a novel MS-STS attention module 312 in the encoder 310 to capture spatio-temporal feature relationships at multiple scales across frames in a video, (ii) a temporal attention block 337 in the decoder 330 for enhancing the temporal consistency of the box queries and (iii) an adversarial loss for enhancing foreground-background (fg-bg) separability. The resulting encoder features 316 along with the temporally consistent instance features 334 from the decoder 330 are used within the matching and segmentation block 340 for the video instance mask 342 prediction.

Figure 4:
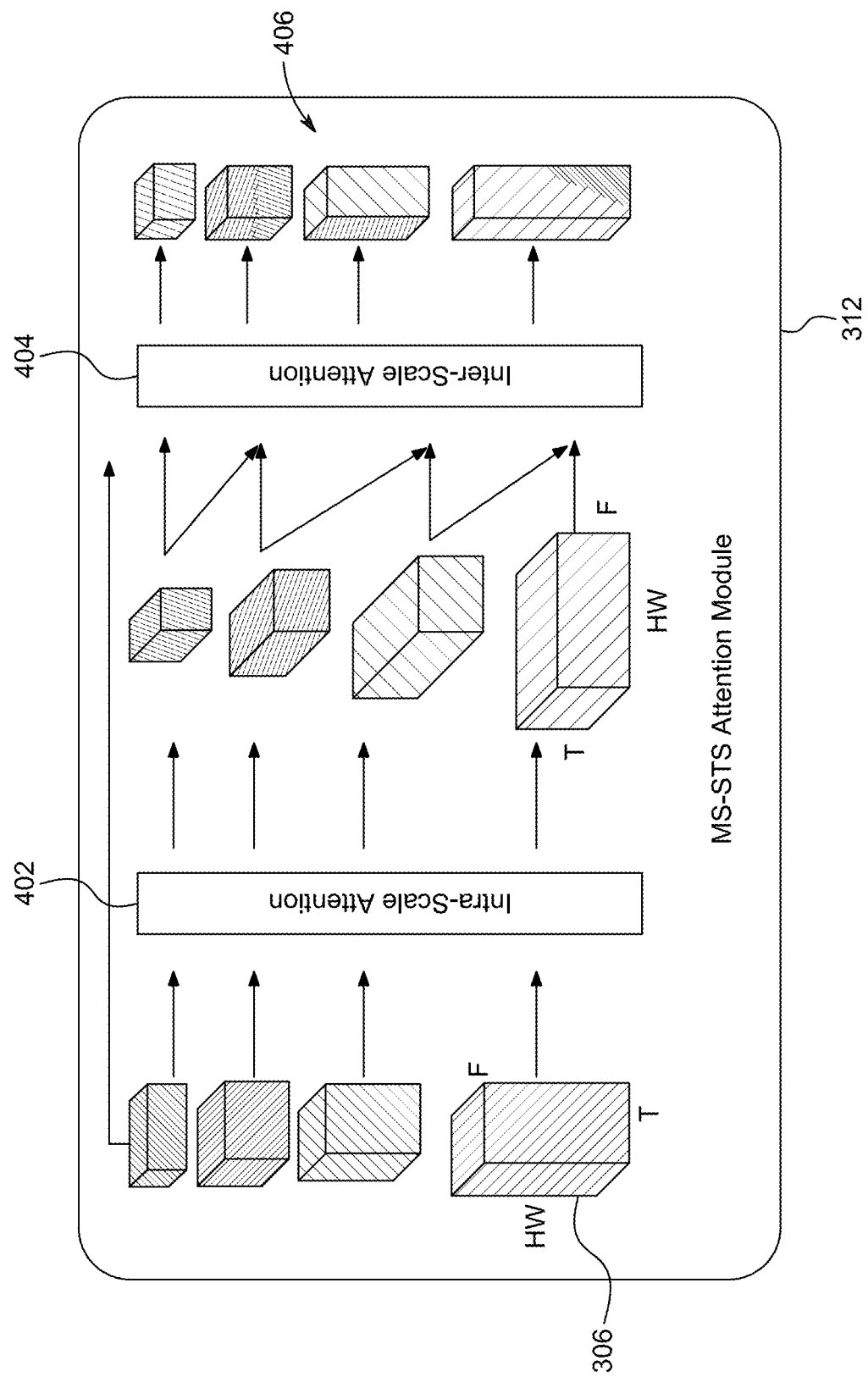
FIG. 4 is a block diagram of the architecture for the MS-STS attention module of FIG. 3.

The multi-scale spatio-temporal split (MS-STS) attention module FIG. 4 in the transformer encoder 310 effectively captures spatio-temporal feature relationships at multiple scales across frames in a video. The MS-STS attention module 312 comprises intra- and inter-scale temporal attention blocks 402, 402. The intra-scale block 402 takes C-dimensional backbone features F 306 as input and enriches features across frames in a video within a given scale, whereas the inter-scale block 404 then progressively attends to multiple spatial scales across frames to generate spatio-temporally enriched features C-dimensional $\hat{Z}$ 406. These features $\hat{Z}$ 406 are fused in each encoder layer with the base features output by the conventional deformable attention 314. While backbone features F 306 are used as input to the first encoder layer, the subsequent layers utilize the outputs from the preceding layer as input. As a result, multi-scale spatio-temporally enriched features C-dimensional E 316 are output by the encoder 310.

Afterwards, these enriched features E 316 from the encoder 310 are input to the transformer decoder 330. To achieve temporal consistency among box queries from different frames, the transformer decoder 330 includes a temporal attention block 337. Next, the encoder features E 316 along with the instance features $I^O$ 334 (aggregated temporally attended box queries) from the decoder 330 are utilized within the instance matching and segmentation block 340 to obtain the video instance mask prediction 342. To further improve the predicted video instance mask quality, an adversarial loss is used during training to enhance foreground-background (fg-bg) separability. The adversarial loss strives to enhance the encoder features 314 by discriminating between the predicted and ground-truth masks, utilizing the encoder features E 316, the input frames x 302 and the binary object mask M.

MS-STS Attention Module Based Encoder

FIG. 4 is a block diagram of the MS-STS attention module. Within the MS-STS VIS framework 300, a multi-scale spatio-temporal split (MS-STS) attention module 312 in the transformer encoder 310 effectively captures spatio-temporal feature relationships at multiple scales across frames. To this end, the MS-STS module 310 takes the backbone features 306 as input and produces multi-scale spatio-temporally enriched features 406, which are then fused with the standard features within the base framework. The MS-STS module 312 includes an intra-scale 402 and an inter-scale 404 attention block.

Figure 5:
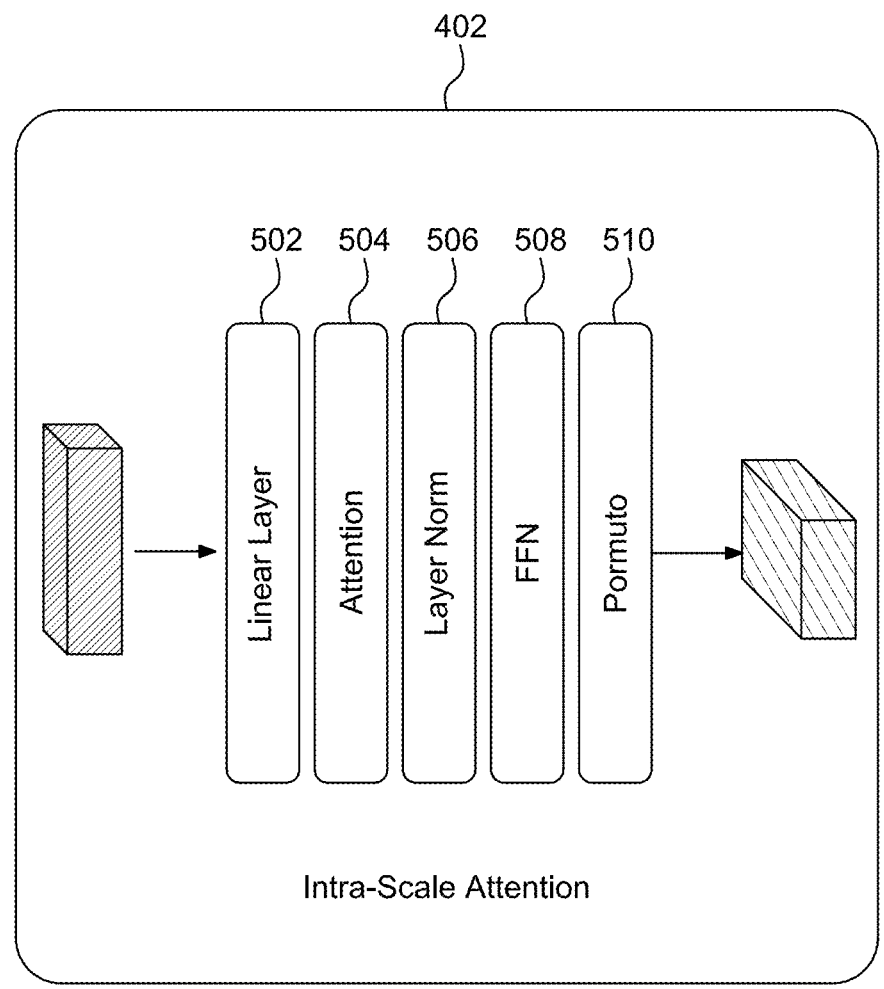
FIG. 5 is a block diagram of the architecture for the intra-scale temporal attention block of FIG. 3.

Intra-scale Temporal Attention Block: FIG. 5 is a block diagram of the intra-scale temporal attention block 402. Given the backbone features as input, the intra-scale block 402 independently attends to each scale (spatial resolution) temporally across frames. $z_{s,t}^l$ 502 is the feature at spatial scale l, position s and frame t, where $s \in [0, S^l-1]$, $t \in [0, T-1]$, and $S^l = H^l \cdot W^l$. The intra-scale temporal attention block 402 processes the features $Z^l \in \mathbb{R}^{s^l \times T \times C}$ using intra-scale self-attention 504 ($SA_{intra}$), layer normalization 506 (LN), and MLP 508 layers as:

$$Y^l = SA_{intra}(LN(Z^l)) + Z^l, \hat{Z}^l = MLP(LN(Y^l)) + Y^l, \quad (1)$$

$$\text{where } SA_{intra}(LN(z_{s,t}^l)) = \sum_{i=0}^{T-1} \text{Softmax}\left(\frac{q_{s,t}^l \cdot k_{s,i}^l}{\sqrt{C}}\right) v_{s,i}^l, \quad (2)$$

where $q_{s,t}^l, k_{s,t}^l, v_{s,t}^l \in \mathbb{R}^D$ are the query, key, and value vectors obtained from $z_{s,t}^l$ (after LN 506) using the embedding matrices $W_q, W_k, W_v \in \mathbb{R}^{C \times C}$. The intra-scale temporal attention 402 operates on each spatial scale l across frames and produces temporally relevant intermediate features $\{\tilde{Z}^l\}_{l=1}^{L}$.

Figure 6:
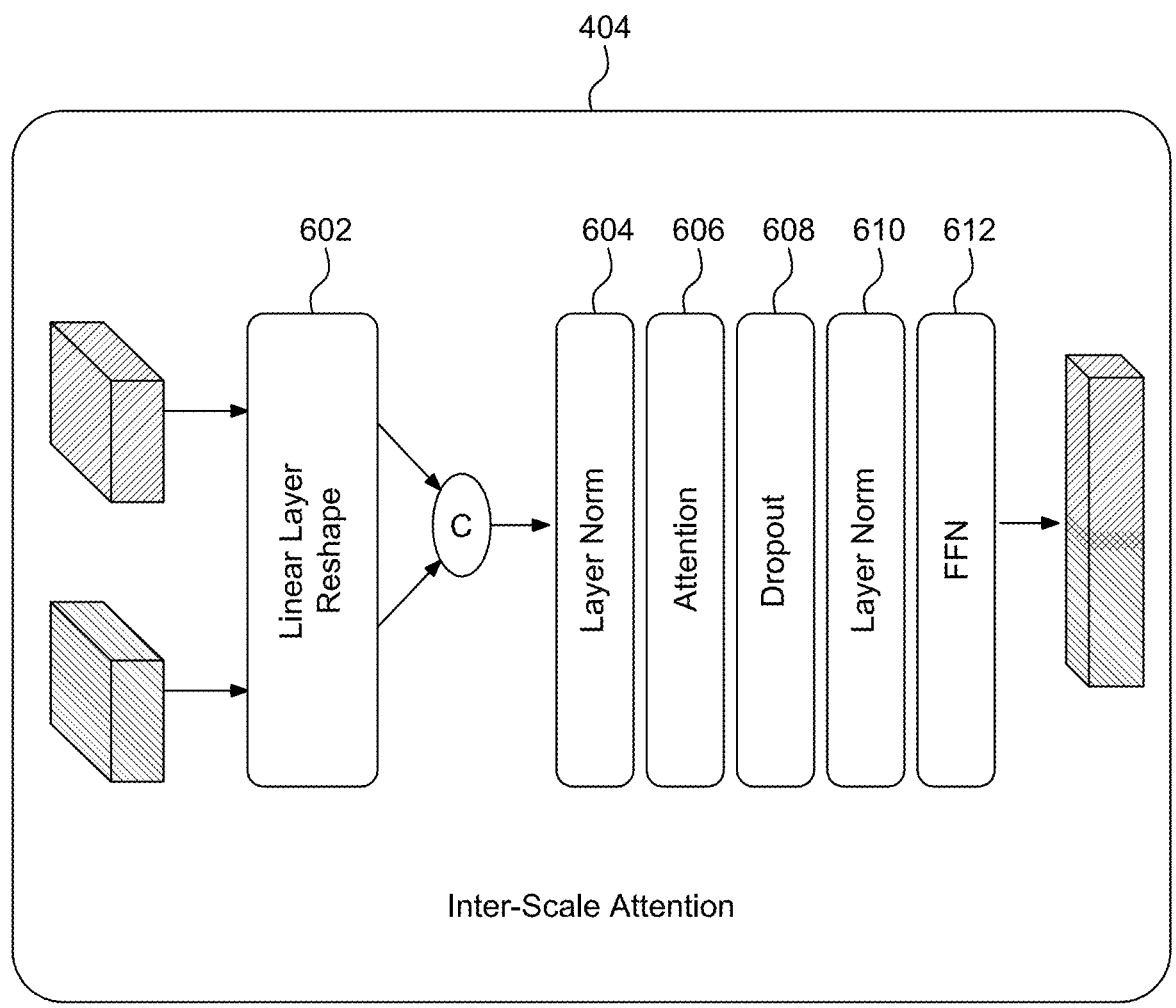
FIG. 6 is a block diagram of the architecture for the inter-scale attention block of FIG. 3.

Inter-scale Temporal Attention Block: FIG. 6 is a block diagram of the inter-scale counterpart. The inter-scale temporal attention block 404 takes the intermediate features output by the intra-scale block 402 and aims to learn similarities between the spatio-temporal features across two neighbouring spatial scales. Let $\tilde{Z}^l \in \mathbb{R}^{s^l \times T \times C}$ and $\tilde{Z}^{l+1}$ be the intra-scale attended features at spatial scales l and l+1. To compute inter-scale temporal attention between the two neighbouring scale features, the lower resolution features are upsampled by ×2 using bilinear interpolation, concatenated along the feature dimensions and projected into C dimensions using $W_p \in \mathbb{R}^{2C \times C}$ as:

$$H^l = W_p(\text{CONCAT}(\tilde{Z}^l, \text{UPSAMPLE}(\tilde{Z}^{l+1}))). \quad (3)$$

A linear layer 602 reshapes $H^l \in \mathbb{R}^{S^l \times T \times C}$ to $\mathbb{R}^{(S^l \cdot T) \times C}$ and then computes the joint spatiotemporal attention to obtain enriched features $\hat{Z}^l$ given by $$Y^l = SA_{inter}(LN(H^l)) + H^l, \hat{Z}^l = MLP(LN(Y^l)) + Y^l, \quad (4)$$

where the inter-scale self-attention ($SA_{inter}$) computation is given by $$SA_{inter} = \sum_{\hat{s}=0}^{S-1} \sum_{\hat{t}=0}^{T-1} \text{Softmax}\left(\frac{q_{s,t}^l \cdot k_{\hat{s},\hat{t}}^l}{\sqrt{C}}\right) v_{\hat{s},\hat{t}}^l. \quad (5)$$

Thus, the MS-STS attention module 312 utilizes an intra-scale temporal attention block 402 to first attend to features across frames at a given spatial scale. It then employs an inter-scale temporal attention block 404 to progressively attend to neighboring spatial scales across frames for obtaining enriched feature representations $\hat{Z}^l$. The resulting features $\hat{Z}^l$ are fused with the standard baseline features output from the deformable attention block 314 through a convolution operation 315. Finally, the encoder 310 outputs enriched multiscale spatio-temporal features E 316 after processing the input features through $N_d$ attention layers.

Figure 7:
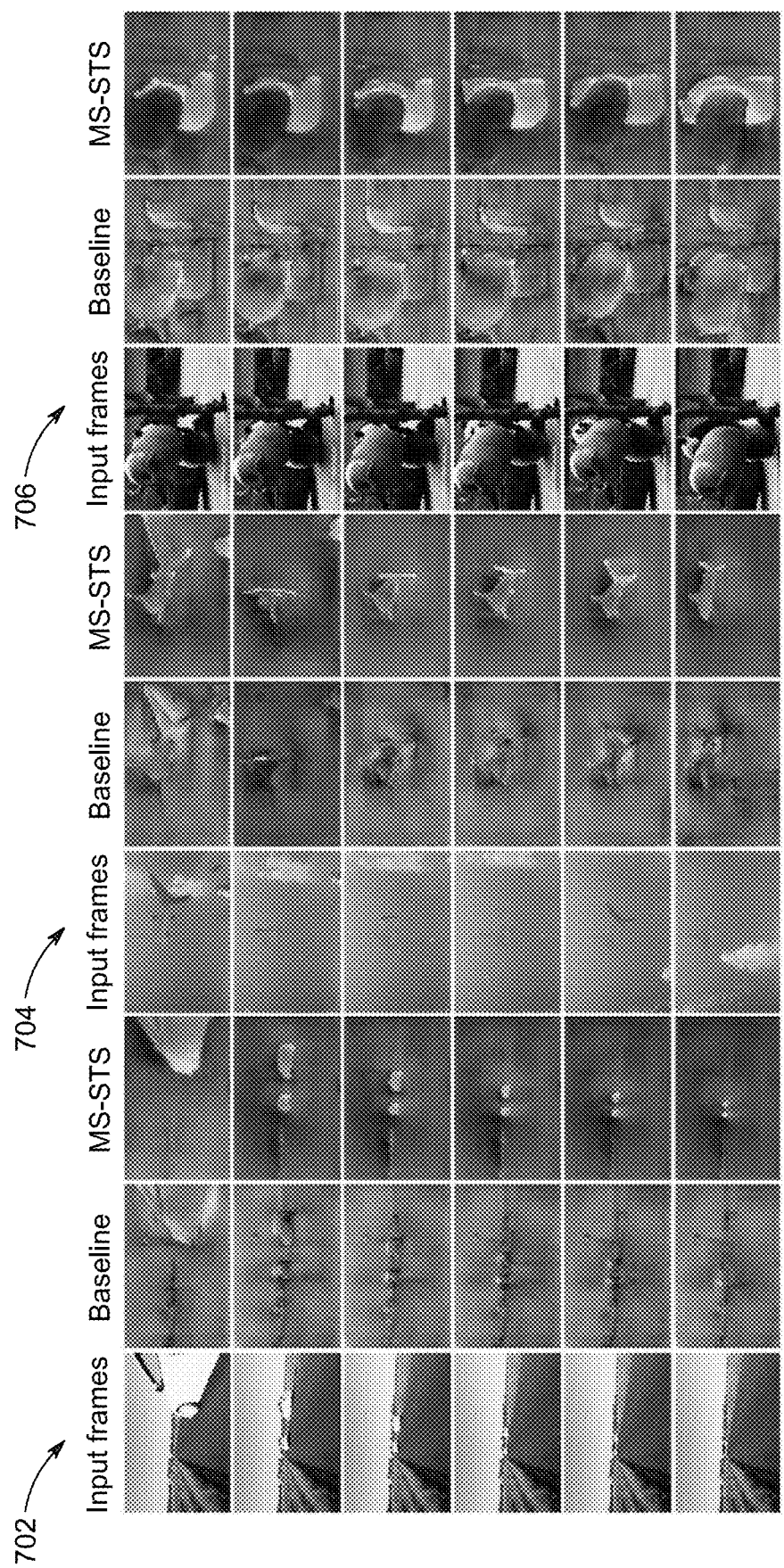
FIG. 7 illustrates an attention map obtained at the output of a baseline encoder and an encoder of the video instance segmentation transformer.

FIG. 7 shows example attention maps obtained at the output of the MS-STS attention module-based encoder. The attention maps are computed as the average activation strength across the C features at a particular spatial position for the largest scale considered, i.e., H/8×W/8. The attention maps are shown for example videos from YouTube-VIS 2019 val. set depicting target appearance deformations. The encoder output is compared to that of the baseline encoder. Compared to the baseline, the MS-STS module-based encoder 310 better focuses on the car instance (left video 702) undergoing scale variations, the shark instance (middle video 704) undergoing aspect-ratio change, the person instance (middle video 704) partially visible only in the first two frames and the panda instance (right video 706) exhibiting target deformations due to the irrelevant object occluding the target panda instance.

Enhancing Temporal Consistency in Decoder

Referring to FIG. 3B, the transformer decoder in the base framework includes a series (layers) of alternating self- and cross-attention blocks, operating on the box queries $B^Q$ of individual frames. Although the video-level instance features $I^O$ are obtained through an aggregation of the corresponding frame-level box features, the temporal consistency of the detected instances is hampered likely due to the per-frame attention computation of the box queries. To alleviate this issue, a temporal attention block 337 is connected in between the self- and cross-attention blocks, 335 and 339, of a decoder layer 330. The temporal attention block 337 attends to the sequence of box queries $\{B_i^Q\}_{i=1}^{T}$ from T frames and produces temporally consistent queries at its output. Such a temporal attention between the per-frame box queries of an instance enables information flow between the probable box locations across frames, thereby improving the temporal consistency of the video mask predictions. The resulting temporally-attended box queries are then utilized to query the multi-scale spatio-temporally enriched features E 316, output by the encoder 310, for computing the box features $B^O$ 332 in a per-frame manner. Afterwards, these box features 332 are aggregated to obtain video-level instance features $I^O$ 334. Finally, the resulting instance features 334 along with the box features 332 and multiscale spatio-temporally enriched features E 316 are input to an instance matching and segmentation block 340 for generating the video mask predictions 342.

Enhancing Foreground-Background Separability

Figure 8:
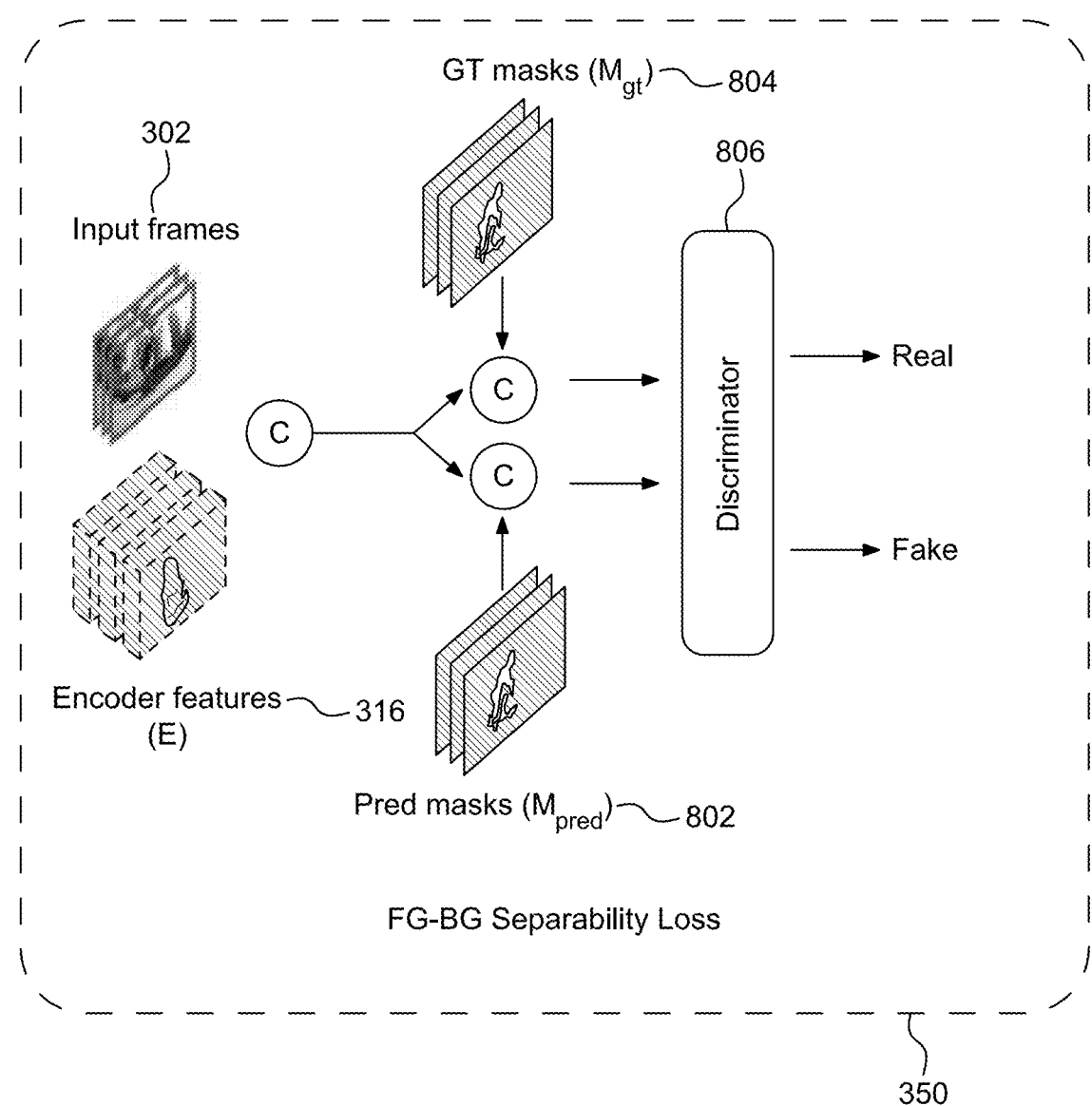
FIG. 8 is a block diagram of the adversarial loss function to enhance foreground-background separability for training the transformer of FIG. 3.

FIG. 8 is a block diagram of the adversarial loss function. Both the MS-STS attention 312 in encoder 310 and temporal attention 337 in decoder 330 promote multi-scale spatio-temporal feature enrichment and temporal consistency, respectively, across frames. This helps to address the critical issue of appearance deformations in the target object due to challenges such as, scale variation, aspect-ratio change and fast motion. In addition to addressing target appearance deformations across frames, another common challenge in the VIS problem is the accurate delineation of foreground objects from the cluttered background. To this end, an adversarial loss is applied during training of the MS-STS VIS 300 framework for enhancing foreground-background (fg-bg) separability.

In the adversarial formulation, an object is to discriminate between the ground-truth mask 804 and the predicted mask 802 output by the MS-STS VIS 300. With this objective, an auxiliary discriminator network 806 is used during training. The discriminator network 806 takes the input frames 302 along with the corresponding encoder features 316 and binary masks 802, 804 as its input. Here, the binary mask M is obtained either from the ground-truth 804 or predictions 802, such that all object instances (category-agnostic) within a frame are marked as foreground. While the discriminator D 806 attempts to distinguish between ground-truth 804 and predicted binary 802 masks ($M_{gt}$ and $M_{pred}$, respectively), the encoder 310 learns to output enhanced features E 316 such that the predicted masks $M_{pred}$ 802 are close to ground-truth 804 $M_{gt}$. Let $F_{gt} = \text{CONCAT}(x, E, M_{gt})$ and $F_{pr} = \text{CONCAT}(x, E, M_{pred})$ denote the real and fake input, respectively, to the discriminator D. Similar to Isola et al., the adversarial loss is then given by $$\min_{Enc} \max_{D} \mathbb{E}[\log D(F_{gt})] + \mathbb{E}[\log(1 - D(F_{pr}))] + \lambda_1 \mathbb{E}[\|D(F_{gt}) - D(F_{pr})\|_1]. \quad (6)$$

See Isola, P., Zhu, J. Y., Zhou, T., Efros, A. A.: Image-to-image translation with conditional adversarial networks. In: CVPR (2017), incorporated herein by reference in its entirety.

Since the mask prediction depends on the quality of the encoder features that are decoded by the queries, the encoder Enc is treated as a generator in the adversarial formulation above. As a result, the encoder learns to better delineate foreground and background regions leading to improved video instance mask prediction. Note that the discriminator network 806 is utilized only during training.

Figure 9:
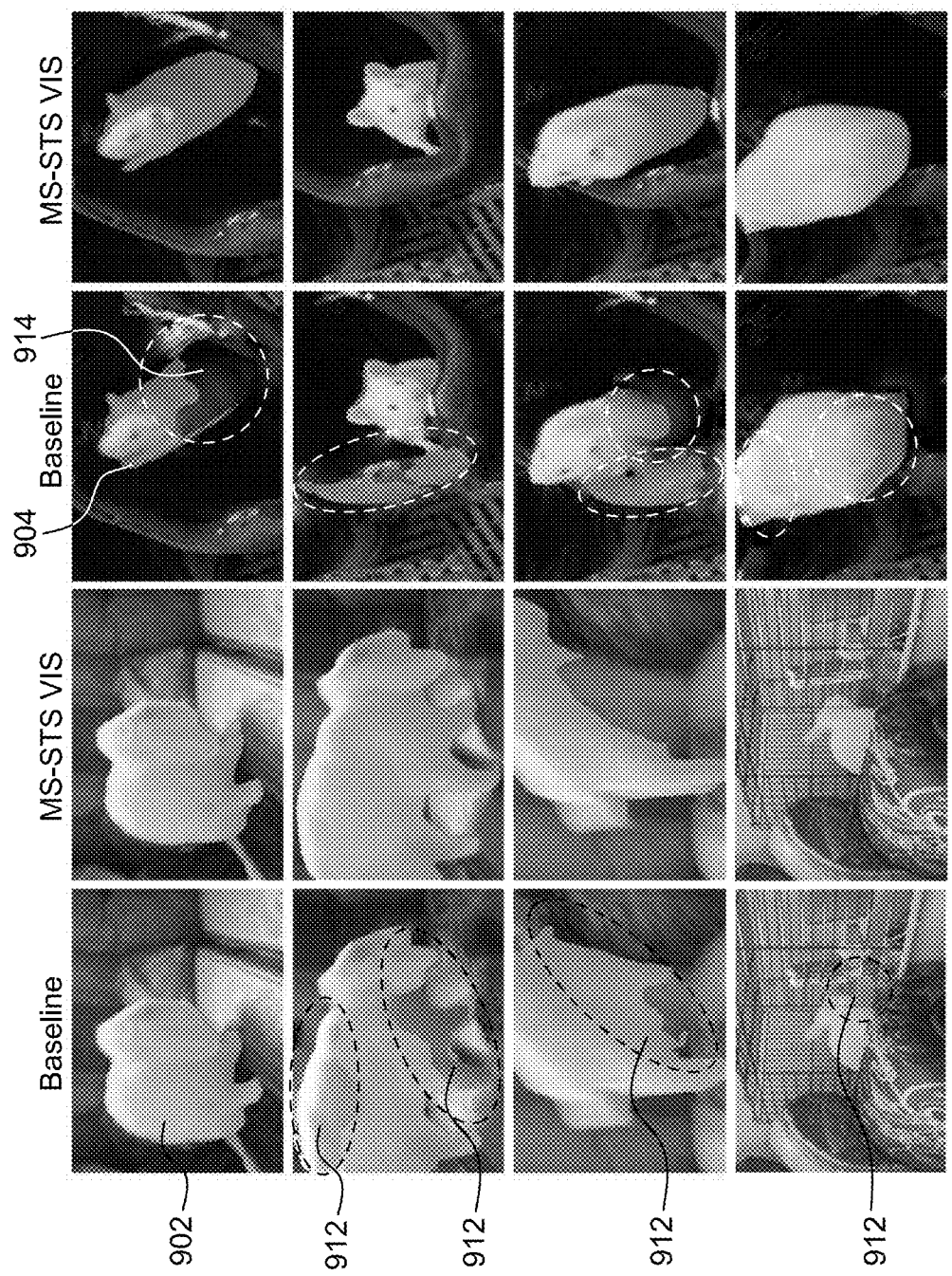
FIG. 9 illustrate qualitative comparisons in the case of target appearance deformations on two example videos.

FIG. 9 illustrate qualitative comparisons in the case of target appearance deformations on two example videos. Qualitative comparison of the MS-STS VIS 300 with the baseline, SeqFormer, in the case of target appearance deformations on two example videos. For each method, four sample video frames are shown along the columns. The baseline struggles to accurately predict the rabbit class 902 instance undergoing appearance deformations due to scale variation, aspect-ratio change and fast motion. As a result, the predicted mask quality is hampered (marked by dotted region 912). Similarly, the mask quality is also deteriorated (914) for the mouse class 904. The MS-STS VIS 300 addresses these issues by capturing multi-scale spatio-temporal feature relationships, leading to improved mask quality.

Figure 10:
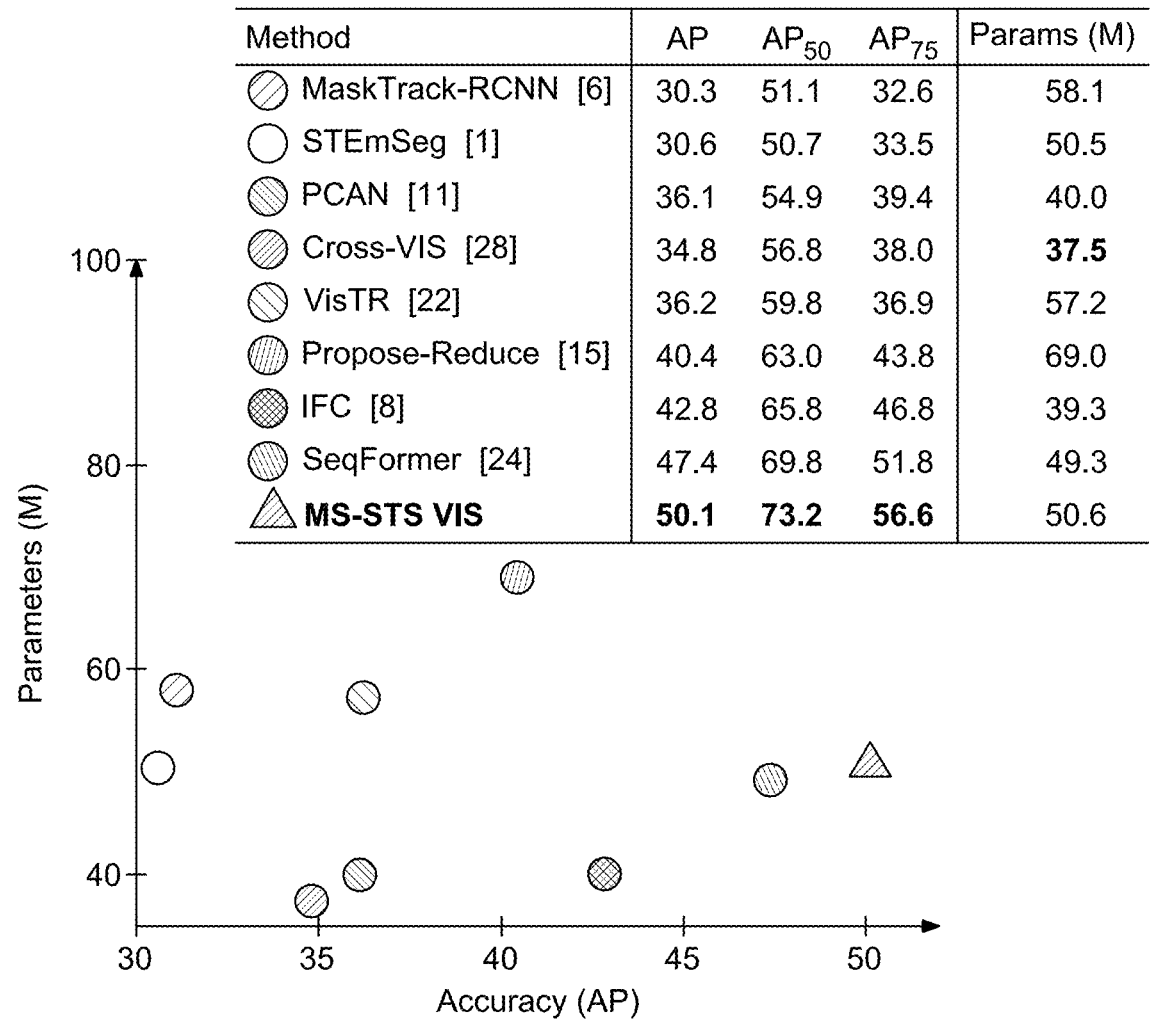
FIG. 10 is a graph of accuracy vs. model size.

FIG. 10 is a graph of accuracy vs. model size. Accuracy (AP) vs. model size (parameters M) comparison with existing methods using a single model and single-scale inference on YouTube-VIS 2019 val. set. FIG. 10 also reports performance at AP50 and AP75. All methods here utilize the same ResNet50 backbone. Compared to the best reported results in literature, MS-STS VIS 300 achieves absolute gains of 2.7% and 4.8% in terms of overall mask AP and at higher overlap threshold of AP75, respectively, while being comparable in model size and speed (Wu et al.: 11 FPS vs. MS-STS VIS: 10 FPS). See Wu et al.

Figure 11:
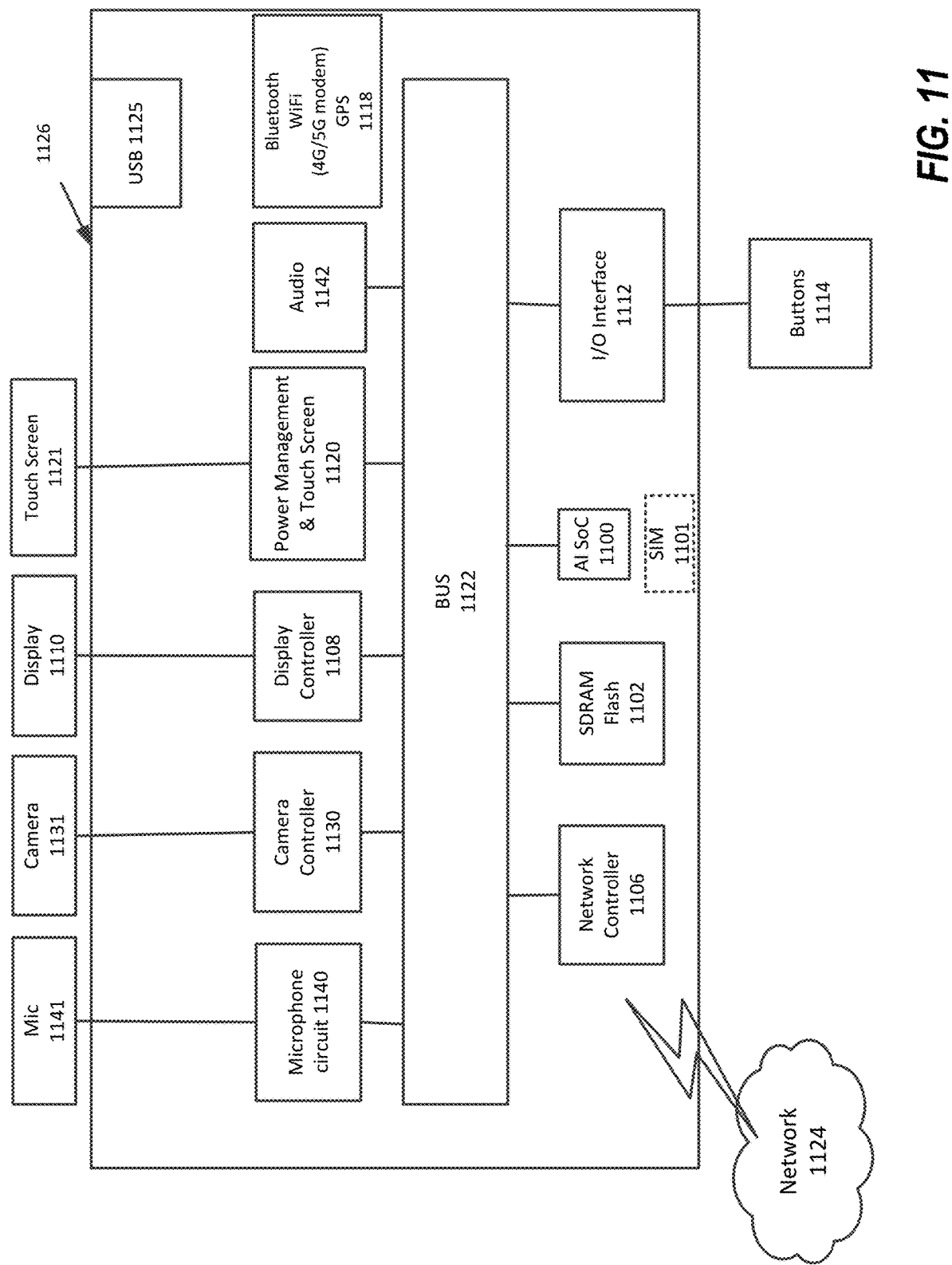
FIG. 11 illustrates a computer vision problem in the case of a road sign.

FIG. 11 is a block diagram of an in-vehicle computer system.

In one implementation, the functions and processes of the in-vehicle computer system 114 may be implemented by one or more respective processing circuits 1126. A processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems. Hence, the circuitry of the server computer system 120 for example may be in only one server or distributed among different servers/computers.

Next, a hardware description of the processing circuit 1126 according to exemplary embodiments is described with reference to FIG. 11. In FIG. 11, the processing circuit 1126 includes an AI System on a Chip (SOC) 1100 which performs the processes described herein. The process data and instructions may be stored in memory 1102. These processes and instructions may also be stored on a portable storage medium or may be stored remotely. The processing circuit 1126 may have a replaceable Subscriber Identity Module (SIM) 1101 that contains information that is unique to the network service of the in-vehicle computer system 114.

Further, the improvements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1126 communicates, such as a server or computer.

Further, the improvements may be provided as a utility application, background daemon, or component of an operating system, or combination thereof, executing in conjunction with SOC 1100 and an operating system such as Android, Microsoft® Windows® 10 Mobile, Apple iOS® and other systems known to those skilled in the art.

In order to achieve the processing circuit 1126, the hardware elements may be realized by various circuitry elements, known to those skilled in the art. For example, SOC 1100 may be a Qualcomm mobile processor, a Nvidia DRIVE processor, a Atom® processor from Intel Corporation of America, a Samsung mobile processor, or a Apple A mobile processor, or may be other processor types that would be recognized by one of ordinary skill in the art. Alternatively, the SOC 1100 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, SOC 1100 may be implemented as multiple processors cooperatively working in parallel to perform the instructions of the inventive processes described above.

The processing circuit 1126 in FIG. 11 also includes a network controller 1106, such as an Intel Ethernet PRO network interface card from Intel Corporation of America, for interfacing with network 1124. As can be appreciated, the network 1124 can be a public network, such as the Internet, or a private network such as LAN or WAN network, or any combination thereof and can also include PSTN or ISDN sub-networks. The network 1124 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing circuit 1126 includes a Universal Serial Bus (USB) controller 1125 which may be managed by the SOC 1100.

The processing circuit 1126 further includes a display controller 1108, such as a NVIDIA® GeForce® GTX or Quadro® graphics adaptor from NVIDIA Corporation of America for interfacing with display 1110. An I/O interface 1112 interfaces with buttons 1114, such as for volume control. In addition to the I/O interface 1112 and the display 1110, the processing circuit 1126 may further include a microphone 1141 and one or more cameras 1131. The microphone 1141 may have associated circuitry 1140 for processing the sound into digital signals. Similarly, the camera 1131 may include a camera controller 1130 for controlling image capture operation of the camera 1131. In an exemplary aspect, the camera 1131 may include a Charge Coupled Device (CCD). The processing circuit 1126 may include an audio circuit 1142 for generating sound output signals, and may include an optional sound output port.

The power management and touch screen controller 1120 manages power used by the processing circuit 1126 and touch control. The communication bus 1122, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1126. A description of the general features and functionality of the display 1110, buttons 1114, as well as the display controller 1108, power management controller 1120, network controller 1106, and I/O interface 1112 is omitted herein for brevity as these features are known.

As such, as illustrated in FIG. 9, MS-STS VTS 300 achieves a significant performance improvement over the baseline, in case of computer vision tasks where there are target appearance deformations especially due to scale variation, aspect-ratio change and fast motion. Non-limiting example applications of the MS-STS VTS 300 in a vehicle are described below.

Figure 12:
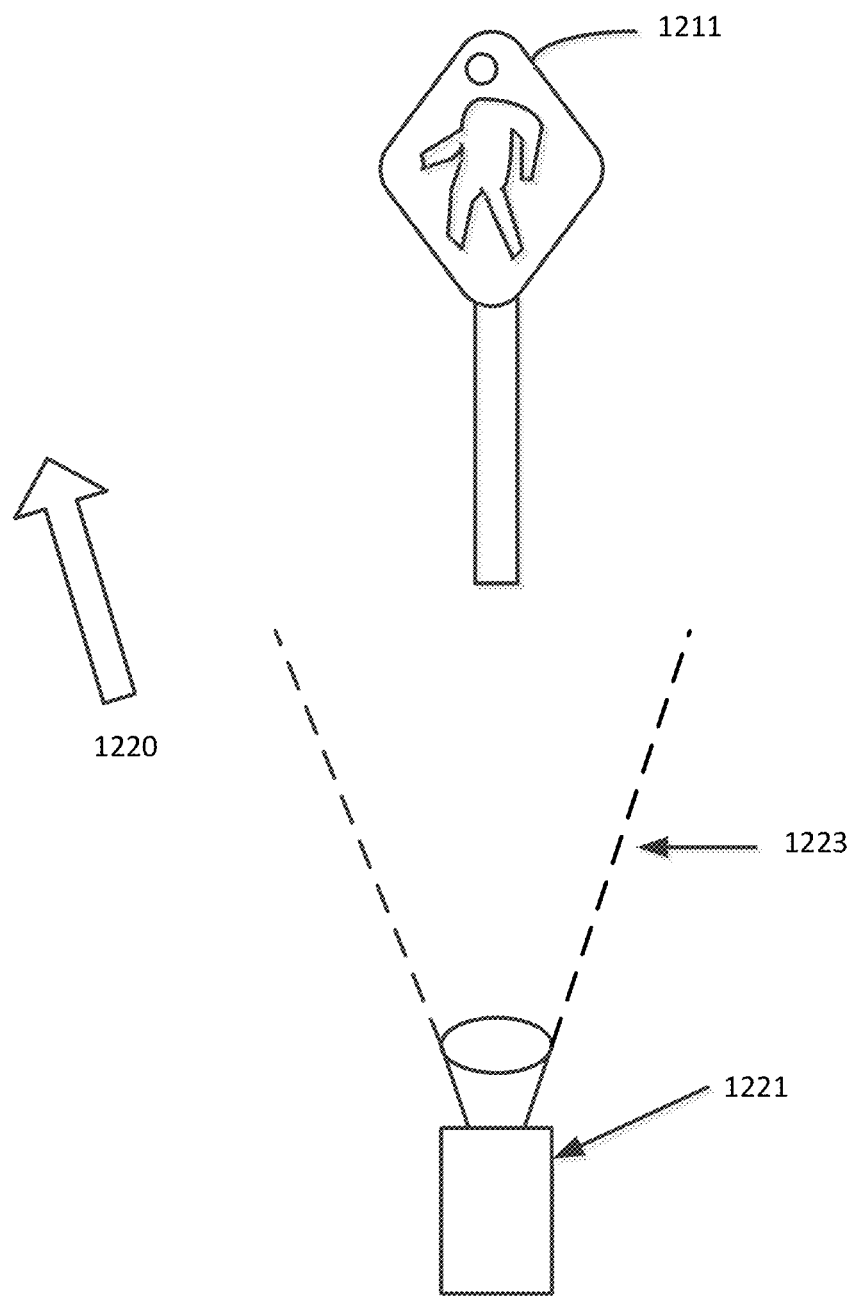
FIG. 12 illustrates a computer vision problem in the case of a pedestrian crossing a road.

FIG. 12 illustrates a computer vision task in the case of a road sign being viewed by a camera on a moving vehicle. Road signs are often signs that display a symbol and may be displayed in positions along the side of a road or in overhead displays that cross over a road. Although the road sign itself is stationary, the vehicle, with the video camera 1221 mounted thereon, is moving at a speed and direction 1220 such that the sequence of images of the road sign may be obtained at different angles, at a range of distances and perspectives, over a short time period. A distance that the road sign first comes into view of the camera may be beyond the distance range of the video camera, such that initially a computer vision system may not be able to recognize the image. Also, the video camera 1221 has a field of view 1223, such that only partial images of the road sign 1211 may be included in the video sequence. In addition, a road sign 1211 may be obscured by other objects as the vehicle moves past the road sign 1211. As such the video sequence obtained by the camera 1221 will include a short sequence of images of the road sign at different scale, in a fast motion over a brief period of time.

The present computer vision system 100 includes at least one video camera 102 connected to a computer and/or computer network 114. A video sequence that includes the road sign is captured by a single video camera 102 or multiple video cameras 102. An external network 120 may be accessed to obtain information associated with the road sign 1211, such as rules that may be associated with the road sign, including, but not limited to, a speed limit requirement associated with the type of road sign.

In one embodiment, training of the MS-STS VTS may be performed in a data center, and an updated trained MS-STS VTS may be downloaded to the vehicle computer system 114. The trained MS-STS VTS 300, included in the vehicle computer system 114, performs inference to effectively capture the spatio-temporal feature relationships at the various scales across frames in the video sequence that includes the road sign, at the different scales, in fast motion, as the vehicle approaches and passes the road sign, in order to segment and track the road sign.

Figure 13:
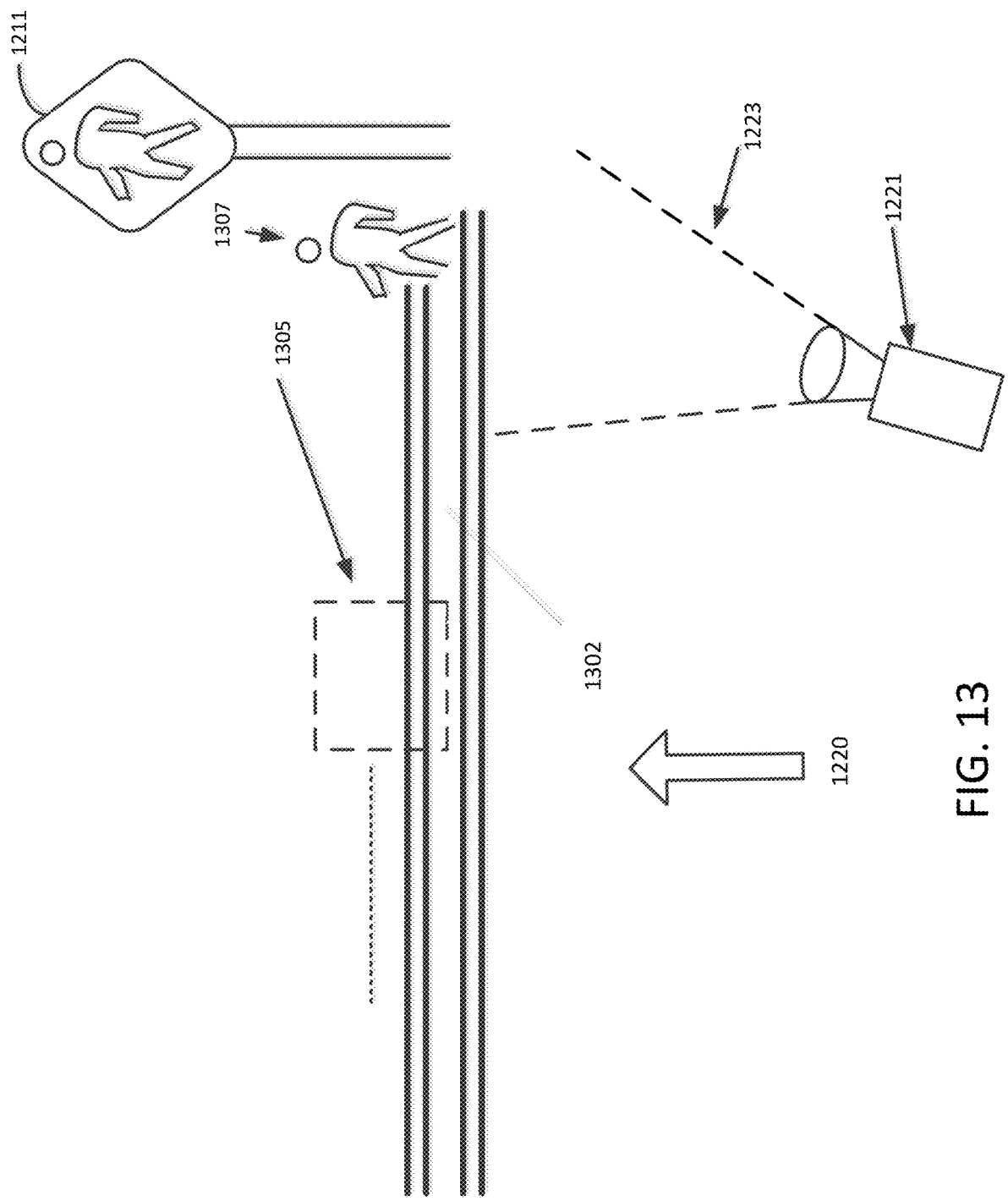
FIG. 13 illustrates a computer vision problem in the case of a group of people playing near a street.

FIG. 13 illustrates a computer vision task in the case of a pedestrian crossing a road while a vehicle is approaching a crosswalk. A vehicle approaching a crosswalk 1302 at a speed and direction 1220 may encounter a road sign 1211 and a pedestrian 1207 at the crosswalk 1202. Again, the road sign 1211 itself is stationary. The movement of the vehicle, with the video camera 1221 mounted thereon, is such that the sequence of images of the road sign may be obtained at different angles, at a range of distances and perspectives, over a short time period. In addition the computer vision system 100 obtains a sequence of images as the pedestrian moves towards the crosswalk. The computer vision system 100 must track the path 1305 of the pedestrian 1307 to determine if the pedestrian is entering the crosswalk 1302, again within a short period of time.

The present computer vision system 100 includes at least one video camera 102 connected to a computer and/or computer network 114. A video sequence is captured by a single video camera 102 or multiple video cameras 102. The trained MS-STS VTS 300 effectively captures the spatio-temporal feature relationships at the various scales across frames in a video sequence that includes the road sign and a pedestrian as the vehicle approaches and passes the road sign, and track a path of the pedestrian in the crosswalk.

Figure 14:
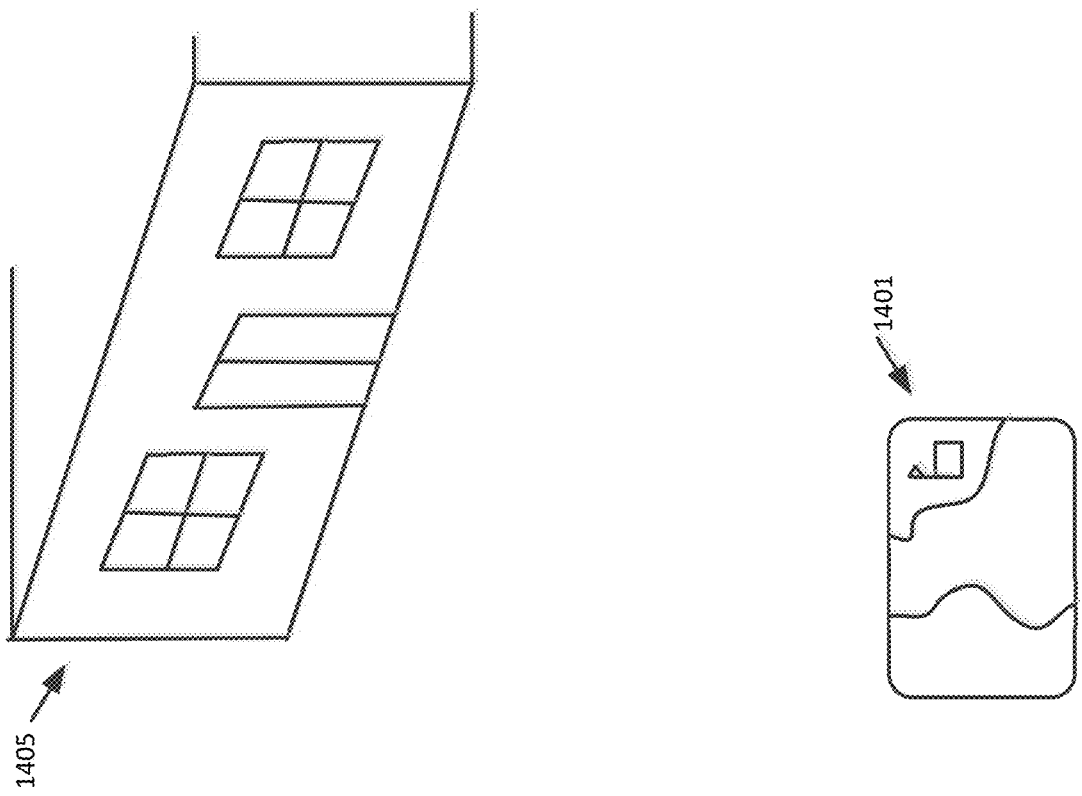
FIG. 14 illustrates a computer vision problem in the case of a road sign indicating location information.
Figure 14:
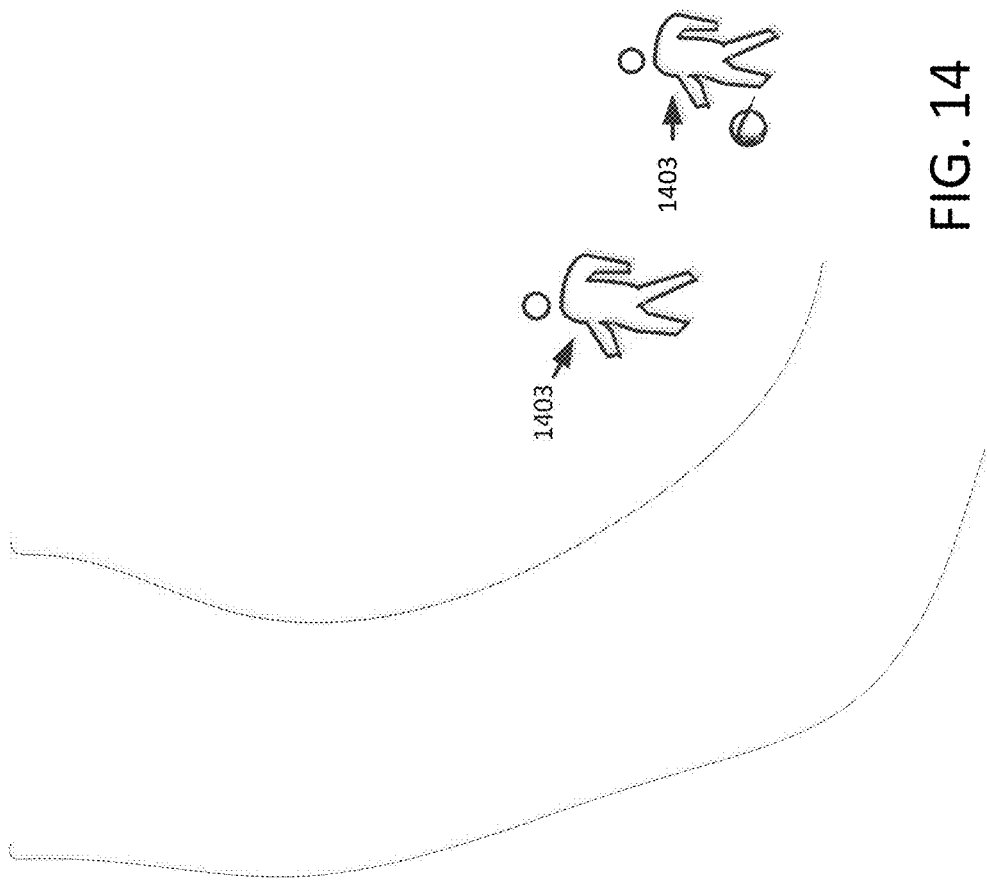

FIG. 14 illustrates a computer vision task in the case of a group of people playing near a street. One or more vehicle cameras 102 may view a scene 1401 containing a public building, such as a school building. In a school yard in the vicinity of a school building 1405, a group of people 1403 may be playing a game. The computer vision task may include tracking movement of the group of people 1403 while the vehicle is driving by the school building 1405 based on a partial view of the school yard. For purposes of safety, the vehicle must be prepared to slow down or stop, for example, when a person 1403 moves near the road or possibly inadvertently steps into the road.

The present computer vision system 100 includes at least one video camera 102 connected to a computer and/or computer network 114. A video sequence may be captured by a single video camera 102 or multiple video cameras 102. The video camera 102 of present MS-STS VTS 300 effectively captures the spatio-temporal feature relationships at the various scales across frames in a video sequence that includes the scene in which people are moving in random directions near the road, crossing paths with each other. The MS-STS VTS 300 can track paths of the moving people 1403 within a short period of time while the vehicle is moving along the road.

Figure 15:
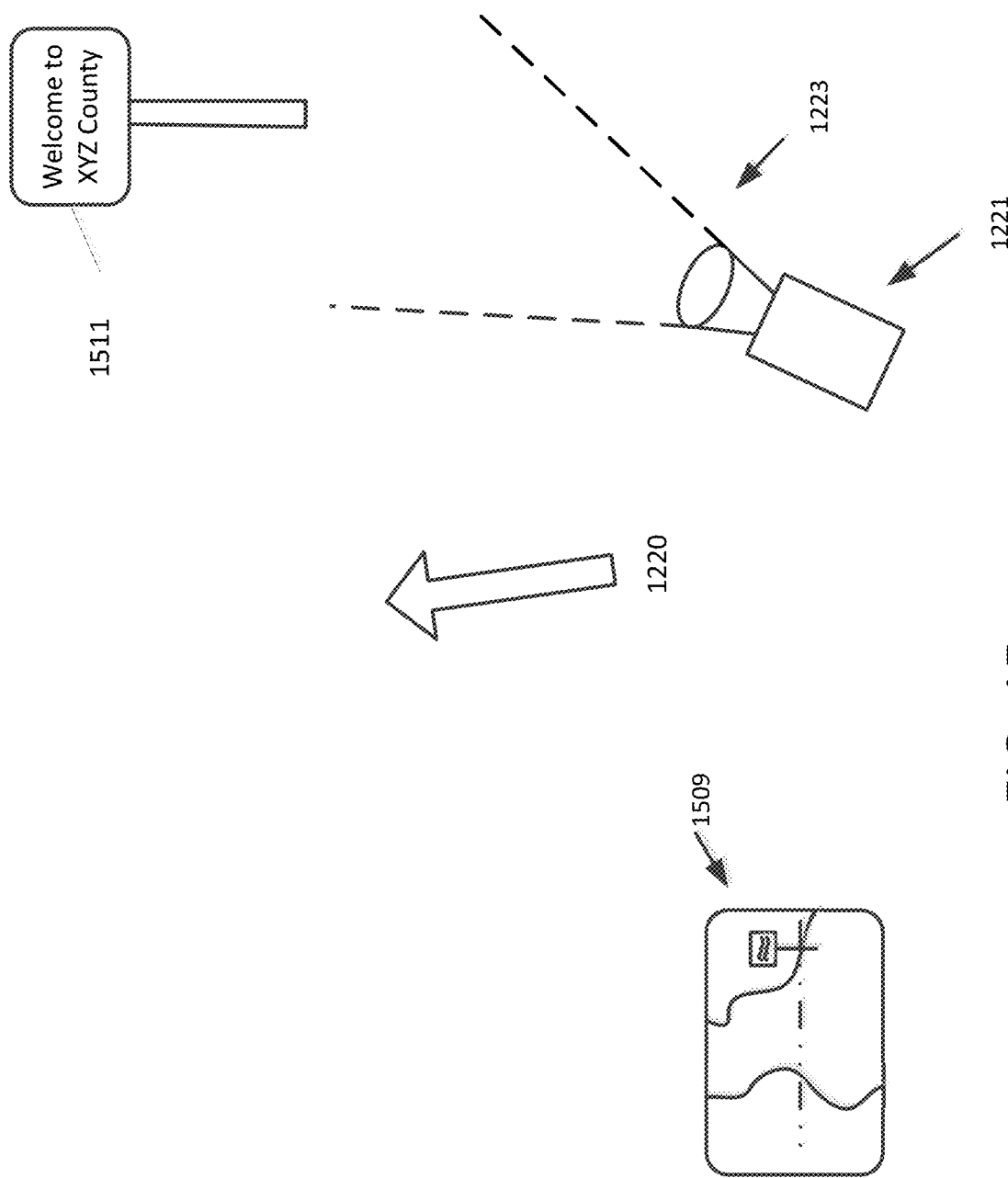
FIG. 15 illustrates a computer vision problem in which a cyclist is approaching a crosswalk.

FIG. 15 illustrates a computer vision task in the case of a road sign indicating location information. At least one vehicle camera 1221 having a field of view 1223 may view a scene 1509 containing a road sign 1511 that displays information of a location, or distance to a location. The computer vision system can recognize the sign including the contents of the sign, while the vehicle is moving. The MS-STS VTS 300 can track the sign under conditions of changing scale of the sign, while the vehicle moves relative to the sign, and subject to various angles of view and partial view of the sign.

Figure 16:
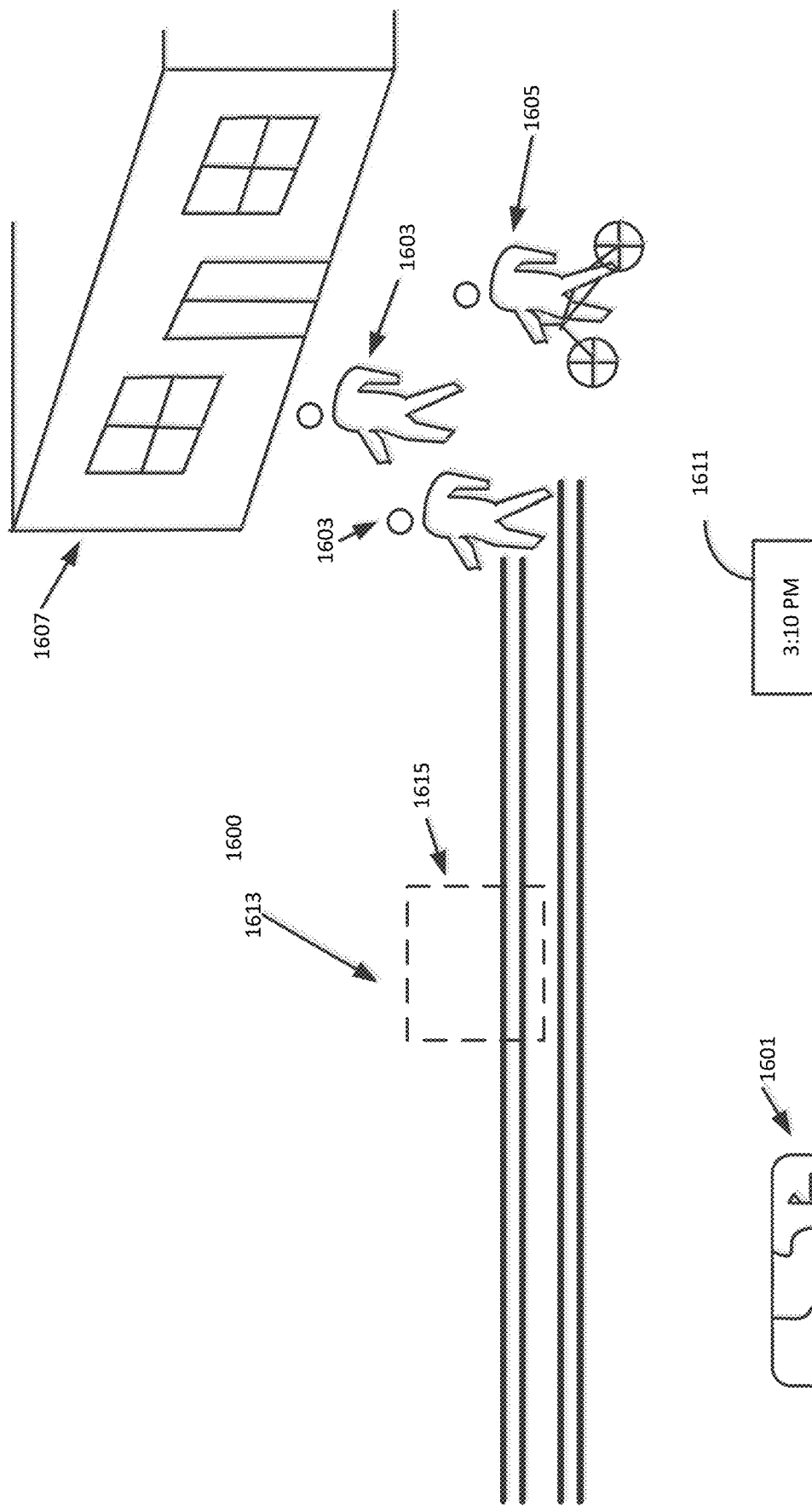
FIG. 16 is a block diagram of a computer system for implementing the video instance segmentation transformer.

FIG. 16 illustrates a computer vision task in which several pedestrians are walking or running at various speeds and at least one cyclist is approaching a crosswalk at a faster speed relative to the pedestrians. A vehicle camera 102 may encounter a complex scene with multiple moving objects, moving at substantially different speeds, all while the vehicle is moving. The camera view 1601 may include a partial scene that includes moving pedestrians 1603 entering and leaving the scene, as well as at least one cyclist 1605 moving at a higher rate of speed, again entering the partial scene. The scene may include a partial view of a building 1607 which complicates the background.

The present computer vision system 100 includes at least one video camera 102 connected to a computer and/or computer network 114. A video sequence may be captured by a single video camera 102 or multiple video cameras 102. A clock 1611 may be used to obtain a time. An external network 120 may be accessed to obtain information associated with the building 1607, including, but not limited to, traffic volume at certain time periods. When the clock time 1611 is within a certain time period, the pedestrians and cyclists that are outside the field of view of a video camera may be anticipated. The trained MS-STS VTS 300 effectively captures the spatio-temporal feature relationships at the various scales across frames in a video sequence that includes the pedestrians 1603 and cyclist 1605 as the vehicle approaches and passes the section of the road where the pedestrians and cyclist are approaching to cross. The MS-STS VTS 300 may also track the motion of the pedestrians and cyclist in a bounding box 1615, as well as the road sign, and track a path 1613 of the pedestrian across the road.

Experiments have been performed for the MS-STS VIS with video instance segmentation datasets in order to compare with other neural network techniques for video instance segmentation. The experiments are performed with standard datasets so that any differences in performance are not due to differences in datasets. Evaluation is performed using standard metrics for image instance segmentation.

EXPERIMENTS

Experimental Setup

Datasets: The datasets used include YouTube-VIS 2019 and YouTube VIS 2021. The YouTube-VIS 2019 dataset contains 2883 high-quality videos with 131K annotated object instances belonging to 40 different categories. See Yang, L., Fan, Y., Xu, N.: Video instance segmentation. In: ICCV (2019) The YouTube-VIS 2021 dataset contains 3,859 high-quality videos with 232K annotated object instances belonging to 40 different improved categories. See Xu, N., Yang, L., Yang, J., Yue, D., Fan, Y., Liang, Y., Huang, T. S.: Youtube-vis dataset 2021 version. https://youtube-vos.org/dataset/vis (2021), incorporated herein by reference in its entirety. The YouTube-VIS 2021 dataset has 40 categories of labels that are set by merging eagle and owl into bird, ape into monkey, deleting hands, and adding flying disc, squirrel and whale, thus maintaining the same number of categories as YouTube-VIS 2019 set. See Xu et al.; and Yang et al. (2019).

Evaluation Metrics: Evaluation follows the standard protocol, where the evaluation metrics, Average Precision (AP) and Average Recall (AR), are adapted from image instance segmentation with the video Intersection over Union (IoU) of the mask sequences as the threshold.

Implementation Details: The MS-STS VIS transformer is implemented on a computer system having 8 Nvidia V100 GPUs. The transformer is pretrained. The MS-STS transformer uses ResNet-50 as the default backbone, unless otherwise specified. See He, K., Zhang, X., Ren, S., Sun, J.: Deep residual learning for image recognition. In: CVPR (2016), incorporated herein by reference in its entirety. Outputs from $conv_3$, $conv_4$ and $conv_5$ of the Resnet backbone are utilized to obtain multi-scale feature inputs to the transformer encoder-decoder, as in Zhu et al. Both encoder and decoder layers are set to $N_d=6$. The feature dimension C is set to 256, while the number of instance queries is set to 300 and length of video clip T=5, as in Wu et al. The AdamW optimizer is used with a base learning rate (LR) of $2\times10^{-4}$, ($\beta1$, $\beta2$)=(0.9, 0.999) and a weight decay of $10^{-4}$. LR of linear projections of deformable attention modules and the backbone are scaled by 0.1. The transformer is first pretrained on COCO for 24 epochs with a batch size of 2. See Lin, T., Maire, M., Belongie, S., Hays, J., Perona, P., Ramanan, D., Dollár, P., Zitnick, L.: Microsoft coco: Common objects in context. In: ECCV (2014), incorporated herein by reference in its entirety. Similar to Wu et al., the pretrained weights are then used to train the transformer on Youtube-VIS and COCO dataset for 12 epochs with T=5 and batch size set to 2. The LR is scaled by a factor of 0.1 at $4^{th}$ and $10^{th}$ epochs. The transformer is trained on the 8 Nvidia V100 GPUs using PyTorch-1.9. See Paszke, A., Gross, S., Massa, F., Lerer, A., Bradbury, J., Chanan, G., Killeen, T., Lin, Z., Gimelshein, N., Antiga, L., Desmaison, A., Kopf, A., Yang, E., DeVito, Z., Raison, M., Tejani, A., Chilamkurthy, S., Steiner, B., Fang, L., Bai, J., Chintala, S.: Pytorch: An imperative style, high-performance deep learning library. In: NeurIPS (2019), http://papers.neurips.cc/paper/9015-pytorch-an-imperative-style-high-performance-deep-learning-library, incorporated herein by reference in its entirety.

State-of-the-Art Comparison

Two-stage VIS: Several VIS methods adapt the two-stage pipeline, such as Mask R-CNN by introducing an additional tracking branch for target association. See Bertasius et al.; Yang et al. (2019); Lin, C., Hung, Y., Feris, R., He, L.: Video instance segmentation tracking with a modified vae architecture. In: CVPR (2020); and He, K., Gkioxari, G., Dollár, P., Girshick, R.: Mask r-cnn. In: ICCV (2017), each incorporated herein by reference in their entirety. The work of Yang et al. (2019) introduces MaskTrack R-CNN that jointly performs detection, segmentation and tracking. Bertasius et al. utilize a branch in Mask R-CNN to propagate frame-level instance masks based on deformable convolutions from each frame to other video frames within a temporal neighborhood. The work of Lin et al. (2020) introduces a modified variational autoencoder (VAE) on top of Mask R-CNN for instance-level video segmentation and tracking.

Single-stage VIS: Several works adapt the one-stage pipeline, such as FCOS detector, where a linear combination of mask bases are directly predicted as final segmentation. See Cao et al.; Athar et al.; Ke et al; Li, M., Li, S., Li, L., Zhang, L.: Spatial feature calibration and temporal fusion for effective one-stage video instance segmentation. In: CVPR (2021); Liu, D., Cui, Y., Tan, W., Chen, Y.: Sg-net: Spatial granularity network for one-stage video instance segmentation. In: CVPR (2021); and Tian, Z., Shen, C., Chen, H., He, T.: FCOS: Fully convolutional one-stage object detection. In: ICCV (2019), each incorporated herein by reference in their entirety. SipMask introduces a spatial information preservation module for real-time VIS. See Cao et al. The work of Athar et al. introduces an approach where a short 3D convolutional spatio-temporal volume is adopted to learn pixel-level embedding by posing segmentation as a bottom-up grouping. The work of Ke et al. proposes to refine a space-time memory into a set of instance and frame-level prototypes, followed by an attention scheme.

Transformer-based VIS: Wang et al. introduce a transformer-based encoder-decoder architecture, named VisTR, that formulates VIS as a direct end-to-end parallel sequence prediction task. In the encoder, VisTR utilizes a single-scale attention that computes similarities between all pairs of features from multiple spatial locations of a low-resolution feature map, across frames. The work of Hwang et al. introduces inter-frame communication transformers, where memory tokens are used to communicate between frames. The recent SeqFormer, built on Deformable DETR framework, utilizes per-frame multi-scale features during attention computations. See Wu et al. and Zhu et al. While demonstrating promising results, SeqFormer struggles in case of target deformations likely due to not explicitly capturing the spatio-temporal feature relationships during attention computation.

Unlike the two-stage, single-stage, and transformer-based approaches for video instance segmentation, the present MS-STS VIS transformer includes an encoder that captures multi-scale spatio-temporal feature relationships. The transformer further includes an attention block in the decoder to enhance temporal consistency of a detected instance in different frames and applies an adversarial loss during training that ensures better fg-bg separability within multi-scale spatio-temporal feature space.

When using the ResNet-50 backbone, the recent one-stage PCAN and CrossVIS approaches achieve an overall mask accuracy (AP) of 36.1% and 36.3%, respectively. See Ke, L., Li, X., Danelljan, M., Tai, Y. W., Tang, C. K., Yu, F.: Prototypical cross-attention networks for multiple object tracking and segmentation. In: NeurIPS (2021); and Yang, S., Fang, Y., Wang, X., Li, Y., Fang, C., Shan, Y., Feng, B., Liu, W.: Crossover learning for fast online video instance segmentation. In: ICCV (2021), each incorporated herein by reference in their entirety. With the same ResNet-50 backbone, the first transformer-based VIS approach, VisTR, built on DETR framework achieves an overall mask AP of 35.6%. See Wang et al. Among existing methods, the recently introduced SeqFormer based on Deformable DETR framework achieves the best overall accuracy with a mask AP of 47.4%. See Wu et al. The present MS-STS VIS transformer outperforms SeqFormer by achieving an overall mask AP of 50.1%, using the same ResNet-50 backbone. See Wu et al.

Specifically, the present MS-STS VIS transformer provides an absolute gain of 4.8% at a higher overlap threshold of AP75 over SeqFormer. Similarly, the MS-STS VIS consistently outperforms SeqFormer with an overall mask AP of 51.1%, when using the ResNet-101 backbone. Finally, when using the Swin Transformer backbone, the present MS-STS VIS transformer achieves the best accuracy reported in literature with an overall mask AP of 61.0%.

Table 1 presents results of the comparison of state-of-the-art approaches using the YouTube-VIS 2019 val. set. The present MR-STS VIS transformer consistently outperforms the other state-of-the-art approaches as reported in literature. When using the ResNet-50 backbone, the present MS-STS VIS transformer achieves overall mask AP score of 50.1% with an absolute gain of 2.7% over the best existing SeqFormer, while being comparable in terms of model size and speed (SeqFormer: 11 FPS vs. Present MS-STS VIS transformer: 10 FPS). Similarly, when using the ResNet-101 backbone, the present MS-STS VIS achieves overall mask AP of 51.1%. Further, MS-STS VIS achieves the best accuracy reported on this dataset with a mask AP of 61.0% and outperforms SeqFormer with an absolute gain of 1.7%, using the same Swin-L backbone.

TABLE 1

State-of-the-art comparison on the YouTube-VIS 2019 val. set.

| Method | Venue | Backbone | Type | AP | $AP_{50}$ | $AP_{75}$ | $AR_1$ | $AR_{10}$ |
|---|---|---|---|---|---|---|---|---|
| IoU Tracker+ | ICCV 2019 | ResNet-50 | — | 23.6 | 39.2 | 25.5 | 26.2 | 30.9 |
| OSMN | CVPR 2018 | ResNet-50 | Two-Stage | 27.5 | 45.1 | 29.1 | 28.6 | 33.1 |
| DeepSORT | ICIP 2017 | ResNet-50 | Two-Stage | 26.1 | 42.9 | 26.1 | 27.8 | 31.3 |
| FEELVOS | CVPR 2019 | ResNet-50 | Two-Stage | 26.9 | 42.0 | 29.7 | 29.9 | 33.4 |
| SeqTracker | ICCV 2019 | ResNet-50 | — | 27.5 | 45.7 | 28.7 | 29.7 | 32.5 |
| MaskTrack R-CNN | ICCV 2019 | ResNet-50 | Two-stage | 30.3 | 51.1 | 32.6 | 31.0 | 35.5 |
| MaskProp | CVPR 2020 | ResNet-50 | — | 40.0 | — | 42.9 | — | — |
| SipMask-VIS | ECCV 2020 | ResNet-50 | One-stage | 32.5 | 53.0 | 33.3 | 33.5 | 38.9 |
| SipMask-VIS | ECCV 2020 | ResNet-50 | One-stage | 33.7 | 54.1 | 35.8 | 35.4 | 40.1 |
| STEm-Seg | ECCV 2020 | ResNet-50 | — | 30.6 | 50.7 | 33.5 | 31.6 | 37.1 |
| Johnander et al. | GCPR 2021 | ResNet-50 | — | 35.3 | — | — | — | — |
| CompFeat | AAAI 2021 | ResNet-50 | — | 35.3 | 56.0 | 38.6 | 33.1 | 40.3 |
| CrossVIS | ICCV 2021 | ResNet-50 | One-stage | 36.3 | 56.8 | 38.9 | 35.6 | 40.7 |
| PCAN | NeurIPS 2021 | ResNet-50 | One-stage | 36.1 | 54.9 | 39.4 | 36.3 | 41.6 |
| VisTR | CVPR 2021 | ResNet-50 | Transformer | 35.6 | 56.8 | 37.0 | 35.2 | 40.2 |
| SeqFormer | Arxiv | ResNet-50 | Transformer | 47.4 | 69.8 | 51.8 | 45.5 | 54.8 |
| MS-STS VIS | 201 | ResNet-50 | Transformer | 50.1 | 73.2 | 56.6 | 46.1 | 57.7 |
| Mask Track R-CNN | ICCV 2019 | ResNet-101 | Two-stage | 31.9 | 53.7 | 32.3 | 32.5 | 37.7 |
| MaskProp | CVPR 2020 | ResNet-101 | — | 42.5 | — | 45.6 | — | — |
| STEm-Seg | ECCV, 2020 | ResNet-101 | — | 34.6 | 55.8 | 37.9 | 34.4 | 41.6 |
| Cross VIS | ICCV 2021 | ResNet-101 | One-stage | 36.6 | 57.3 | 39.7 | 36.0 | 42.0 |
| PCAN | NeurIPS 2021 | ResNet-101 | One-stage | 37.6 | 57.2 | 41.3 | 37.2 | 43.9 |
| VisTR | CVPR 2021 | ResNet-101 | Transformer | 38.6 | 61.3 | 42.3 | 37.6 | 44.2 |
| SeqFormer | Arxiv 2021 | ResNet-101 | Transformer | 49.0 | 71.1 | 55.7 | 46.8 | 56.9 |

TABLE 1-continued

State-of-the-art comparison on the YouTube-VIS 2019 val. set.

| Method | Venue | Backbone | Type | AP | $AP_{50}$ | $AP_{75}$ | $AR_1$ | $AR_{10}$ |
|---|---|---|---|---|---|---|---|---|
| MS-STS VIS | | ResNet-101 | Transformer | 51.1 | 73.2 | 59.0 | 48.3 | 58.7 |
| SeqFormer | Arxiv 2021 | Swin-L | Transformer | 59.3 | 82.1 | 66/6 | 51.7 | 64.4 |
| MS-STS VIS | | Swin-L | Transformer | 61.0 | 85.2 | 68.6 | 54.7 | 66.4 |

AP is Average Precision. AR is Average Recall.

See Yang et al. (2019); Yang, L., Wang, Y., Xiong, X., Yang, J Katsaggelos, A. K.: Efficient video object segmentation via network modulation. In: CVPR (2018); Wojke, N., Bewley, A., Paulus, D.: Simple online and realtime tracking with a deep association metric. In: ICIP (2017); Voigtlaender, P., Chai, Y., Schroff, F., Adam, H., Leibe, B., Chen, L.: Feelvos: Fast end-to-end embedding learning for video object segmentation. In: CVPR (2019); Bertasius, G., Torresani, L.: Classifying, segmenting, and tracking object instances in video with mask propagation. In: CVPR (2020); Cao, J Anwer, R. M., Cholakkal, H., Khan, F. S., Pang, Y., Shao, L.: Sipmask: Spatial information preservation for fast image and video instance segmentation. In: ECCV (2020); Athar, A., Mahadevan, S., Osep, A., Leal-Taixé, L., Leibe, B.: Stem-seg: Spatio-temporal embeddings for instance segmentation in videos. In: ECCV (2020); Johnander, J., Brissman, E., Danelljan, M., Felsberg, M.: Learning video instance segmentation with recurrent graph neural networks. In: GCPI (2021); Fu, Y., Yang, L., Liu, D., Huang, T. S., Shi, H.: Compfeat: Comprehensive feature aggregation for video instance segmentation. AAAI (2021); Yang et al. (2021); Ke et al.; Wang et al.; and Wu et al, each incorporated herein by reference in their entirety.

A comparison of state-of-the-art approaches is made using the YouTube-VIS 2021 val. set. Among existing methods, CrossVIS and IFC achieve overall mask AP scores of 34.2% and 36.6%, respectively. See Yang et al. (2021); and Hwang, S., Heo, M., Oh, S. W., Kim, S. J.: Video instance segmentation using inter-frame communication transformers. In: NeurIPS (2021), each incorporated herein by reference in their entirety. SeqFormer obtains an overall mask AP of 40.5%. See Wu et al. The present MS-STS VIS transformer sets a new state-of-the-art with an overall mask AP of 42.2%. Specifically, the MS-STS VIS transformer provides an absolute gain of 2.8% over SeqFormer at higher overlap threshold of AP75, when using the same ResNet-50 backbone.

Table 2 presents results of the comparison of state-of-the-art approaches using the YouTube-VIS 2021 val. set. All results are reported using the same ResNet-50 backbone.

The present MS-STS VIS transformer achieves state-of-the-art results with an overall mask AP of 42.2% and an absolute gain of 2.8% over the best existing SeqFormer at a higher overlap threshold of AP75.

TABLE 2

State-of-the-art comparison on the YouTube-VIS 2021 val set. AP is Average Precision. AR is average Recall.

| Method | AP | $AP_{50}$ | $AP_{75}$ | $AR_1$ | $AR_{10}$ |
|---|---|---|---|---|---|
| MaskTrack R-CNN | 28.6 | 48.9 | 29.6 | 26.5 | 33.8 |
| SipMask-VIS | 31.7 | 52.5 | 34.0 | 30.8 | 37.8 |
| VisTR | 31.8 | 51.7 | 34.5 | 29.7 | 36.9 |
| Cross VIS | 34.2 | 54.4 | 37.9 | 30.4 | 38.2 |
| IFC | 36.6 | 57.9 | 39.9 | — | — |
| SeqFormer | 40.5 | 62.4 | 43.7 | 36.1 | 48.1 |
| MS-STS VIS | 42.2 | 63.7 | 46.5 | 41.7 | 51.1 |

See Xu et al.; Cao et al.; Wang et al.; Yang et al. (2021); Hwang et al.; and Wu et al., each incorporated herein by reference in their entirety.

Table 3 (on the left) presents the impact of the present MS-STS VIS transformer when progressively integrated into the baseline on the Youtube-VIS 2019 val. set. A consistent performance improvement can be seen due to the integration of the present MS-STS VIS transformer. The final MS-STS VIS (row 4) achieves an absolute gain of 3.7% over the baseline. On the right, the table presents an attribute-based performance comparison between the baseline and the present MS-STS VIS transformer on the custom set comprising 706 videos in total. The comparison is for fast motion, target size change and aspect-ratio change attributes. The present MS-STS VIS transformer achieves consistent improvement in performance over the baseline on all attributes.

TABLE 3

(Left), Impact of the present MS-STS VIS transformer when progressively integrated into the baseline on the YouTube-VIS 2019 val. Set; (Right) Attribute-based performance comparison between the baseline and the present MS-STS VIS transformer on the custom set comprising 706 videos in total. AP is Average Precision.

| Model | AP | Attribute Type | # Videos | Baseline | MS-STS VIS |
|---|---|---|---|---|---|
| Baseline | 46.4 | Custom Set | 706 | 49.5 | 53.7 |
| Baseline + MS-STS | 48.4 | Fast Motion | 605 | 48.9 | 54.2 |
| Baseline + MS-STS + T-Dec | 49.1 | Target Size Change | 706 | 49.5 | 53.7 |
| Baseline + MS-STS + T-Dec + FG-BG Loss | 50.1 | Aspect-Ratio Change | 687 | 49.2 | 53.9 |

Ablation Study

An ablation study was performed to evaluate the merits of three proposed MS-STS-based transformers: a transformer having an MS-STS attention module-based encoder, a transformer having temporal attention in the decoder, and a transformer having the adversarial loss for enhancing fg-bag separability. Table. 3 (left) shows the baseline comparison on the YouTube-VIS 2019 val. set. All results reported in Table. 3 (left) are obtained using the same ResNet50 backbone. As discussed earlier, the present MS-STS VIS transformer employs SeqFormer as its base framework. The baseline SeqFormer (denoted here as Baseline) is trained using the official implementation and achieves an overall mask AP score of 46.4%. The transformer having the MS-STS attention module-based encoder within the baseline (referred as Baseline+MS-STS) significantly improves the overall performance to 48.4% with an absolute gain of 2.0%. The overall performance is further improved to 49.1% with the integration of the temporal attention in the decoder (denoted as Baseline+MS-STS+T-Dec). Finally, the introduction of the adversarial loss during the training for enhancing the fg-bg separability provides an absolute gain of 1.0% (denoted as Baseline+MS-STS+T-Dec+FG-BG Loss). The final MS-STS VIS transformer achieves an absolute gain of 3.7% over the baseline.

The performance of the present MS-STS VIS transformer is further analyzed under three specific challenging scenarios: fast motion, target size change (scale variation) and aspect-ratio change. In this analysis, the videos are classified into three categories: (i) fast motion of the object, (ii) object size changes, and (iii) aspect-ratio changes. In particular, the analysis follows the well-established VOT-2015 benchmark to label a particular video from above categories as follows: (i) fast motion: if object center in current frame moves by at least 30% of its size in previous frame. See Kristan, M., Matas, J., Leonardis, A., Felsberg, M., Cehovin, L., Fernandez, G., Vojir, T., Hager, G., Nebehay, G., Pflugfelder, R.: The visual object tracking vot2015 challenge results. In: ICCV workshops (2015), incorporated herein by reference in its entirety; (ii) change in object size: if the ratio of the maximum size to the minimum size of an object in the video is greater than 1.5; and (iii) change in aspect-ratio: if the ratio of the maximum to the minimum aspect (width/height) of the bounding box enclosing an object in the video is greater than 1.5.

Based on the aforementioned criteria, the analysis first selects the newly added videos in the YouTube-VIS 2021 training set while retaining the same set of classes as in YouTube-VIS 2019 dataset. These selected videos are referred to as custom set and are classified into the aforementioned attributes. To evaluate the performance of the present MS-STS VIS transformer and the baseline, the models that were trained on YouTube-VIS 2019 training set with the same ResNet-50 backbone are used. Note that there is no overlap between the videos in YouTube-VIS 2019 training set and the custom set (only comprising the newly added videos from the YouTube-VIS 2021 training set). Table. 3 (right) shows the comparison between the baseline SeqFormer and the present MS-STS VIS transformer. On the entire custom set, the present MS-STS VIS transformer obtains significantly improved performance over the baseline. Specifically, the present MS-STS VIS transformer achieves absolute gains of 5.3%, 4.2% and 4.7% over the baseline on fast motion, target size change and aspect-ratio change attributes, respectively.

Qualitative Analysis

Figure 17:
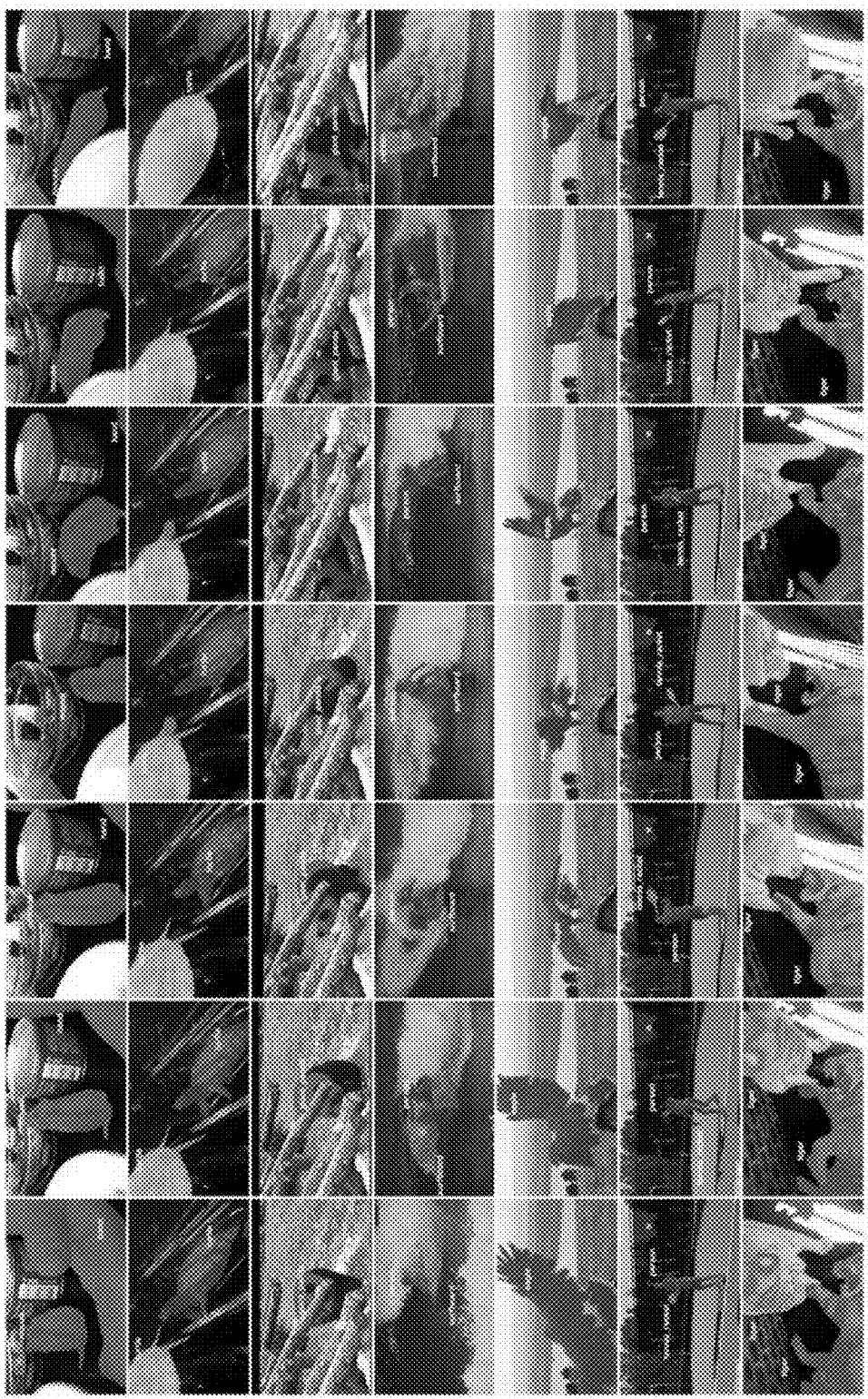
FIG. 17 illustrates qualitative results obtained by the video instance segmentation transformer.
Figure 18:
FIG. 18 illustrates qualitative results obtained by the video instance segmentation transformer.

FIGS. 17 and 18 illustrate qualitative results obtained by the MS-STS VIS framework on example videos from the YouTube-VIS 2019 val. and 2021 val. sets, respectively. The present MS-STS VIS transformer can obtain a promising video mask prediction in various challenging scenarios involving target appearance deformations due to fast motion, aspect-ratio change and scale variation. For example, in FIG. 17, video masks are predicted accurately for a hand in row 1702 (scale change), a eagle in row 1710 (fast motion, aspect-ratio change, scale variation), a panda in row 1706 a person in row 1708 (aspect-ratio change), and for a tiger in row 1714 (multiple instances of same class). Similarly, promising video masks predictions can be made for a leopard in row 1802 (fast motion), a person and seal in row 1808 (scale variation), a dog in row 1804 and tiger in row 1812 (aspect-ratio change, scale variation), as illustrated in FIG. 18. These results show the efficacy of the present MS-STS VIS transformer under different challenges for the task of video instance segmentation.

The present MS-STS VIS transformer specifically tackles target appearance deformations due to real-world challenges such as, scale variation, aspect-ratio change and fast motion in videos. An auxiliary discriminator network is applied during training that enhances fg-bg separability within the multi-scale spatio-temporal feature space.

Numerous modifications and variations of the present invention are possible in light of the above teachings. It is therefore to be understood that within the scope of the appended claims, the invention may be practiced otherwise than as specifically described herein.

The invention claimed is:
1. A vehicle computer vision system, comprising:
    at least one video camera mounted on a vehicle to capture a stream of video data;
    video processor circuitry configured to input the stream of video data and generate a sequence of image frames;
    segment and track object instances in the stream of video data, including
        receiving the sequence of image frames;
        obtaining a video instance mask sequence from the sequence of image frames, via a video instance segmentation transformer having
            a backbone network,
            a transformer encoder-decoder, and
            an instance matching and segmentation block,
    wherein the encoder contains a multi-scale spatio-temporal split (MS-STS) attention module to capture spatio-temporal feature relationships at multiple scales across multiple frames of the sequence of image frames, the MT-STS attention module producing multi-scale spatio-temporal enriched features;
    wherein the decoder contains a temporal attention block for enhancing a temporal consistency of transformer queries;
    wherein the encoder further contains a deformable attention block that outputs baseline features, the baseline features being fused with the multi-scale spatio-temporal enriched features through a convolution operation to obtain encoder output features; and
    display a sequence of mask instances.

2. The vehicle computer vision system of claim 1, wherein
the MS-STS attention module of the video processor circuitry employs an intra-scale temporal attention block and an inter-scale temporal attention block;
the intra-scale temporal attention block of the video processor circuitry operates on each spatial scale across the multiple frames and produces temporally relevant intermediate features; and
the inter-scale temporal attention block of the video processor circuitry takes the temporally relevant intermediate features output by the intra-scale temporal attention block and learns similarities between the spatial-temporal feature relationships across two neighboring spatial scales.

3. The vehicle computer vision system of claim 1, wherein the video processor circuitry is further configured to
during training, use an adversarial loss to improve the spatio-temporal feature relationships which enhances foreground-background separability.

4. The vehicle computer vision system of claim 1, wherein an output of the encoder and the temporally consistent transformer queries from the decoder are used within the instance matching and segmentation block of the video processor circuitry for prediction of the sequence of mask instances.

5. The vehicle computer vision system of claim 1, wherein the temporal attention block of the decoder is connected between a self-attention block and a cross-attention block of the decoder.

6. The vehicle computer vision system of claim 1, wherein
the received sequence of image frames includes a sequence of image frames of a road sign of different scales, in motion; and
the multi-scale spatio-temporal split attention module captures the spatio-temporal feature relationships at multiple scales across multiple frames that includes the road sign as the vehicle approaches and passes the road sign.

7. The vehicle computer vision system of claim 1, wherein
the received sequence of video image frames includes a sequence of image frames of a road sign of different scales, in motion, and at least one pedestrian also at different scales moving in a direction of a crosswalk; and
the multi-scale spatio-temporal split attention module captures the spatio-temporal feature relationships at multiple scales across multiple frames that includes the road sign as the vehicle approaches the road sign together with the at least one pedestrian moving toward the crosswalk.

8. The vehicle computer vision system of claim 1, wherein
the received sequence of video image frames includes a dynamic scene in which people are moving in random directions in a vicinity of a road which the vehicle is traveling, crossing paths with each other;
the multi-scale spatio-temporal split attention module captures the spatio-temporal feature relationships at multiple scales across multiple frames that includes the moving people as the vehicle approaches the moving people; and
the vehicle computer vision system tracks the moving people.

9. The vehicle computer vision system of claim 1, wherein
the received sequence of video image frames includes a scene containing a location road sign that displays information of a location;
the multi-scale spatio-temporal split attention module
captures the spatio-temporal feature relationships at multiple scales across multiple frames that includes the information of the location road sign, under conditions of changing scale of the location road sign, subject to various angles of view and partial view of the location road sign, and
recognizes the road sign including the information of the road sign, while the vehicle is moving, under conditions of changing scale of the location road sign, while the vehicle moves relative to the location road sign, and subject to various angles of view and partial view of the location road sign.

10. The vehicle computer vision system of claim 1, wherein
the received sequence of video image frames includes a partial scene of a road where the vehicle is traveling that includes a plurality of moving pedestrians entering and leaving the partial scene, at least one cyclist moving at a higher rate of speed relative to the plurality of pedestrians, into the partial scene, and a partial view of a building;
the multi-scale spatio-temporal split attention module captures the spatio-temporal feature relationships at various scales across frames in the video sequence that includes the plurality of pedestrians and the at least one cyclist as the vehicle approaches and passes a section of the road where the pedestrians and the at least one cyclist are approaching to cross; and
the vehicle computer vision system tracks the moving plurality of pedestrians and at least one cyclist.

11. A non-transitory computer-readable storage medium storing computer program instructions, which when executed in a vehicle computer vision system, the vehicle computer vision system comprising at least one video camera mounted on a vehicle, and video processor circuitry, perform a method comprising:
inputting a stream of video data and generating a sequence of image frames;
segmenting and tracking, by the video processor circuitry, object instances in the stream of video data, including
receiving the sequence of image frames;
analyzing the sequence of image frames using a video instance segmentation transformer to obtain a video instance mask sequence from the sequence of image frames, the transformer having
a backbone network,
a transformer encoder-decoder, and
an instance matching and segmentation block,
wherein the encoder contains a multi-scale spatio-temporal split (MS-STS) attention module to capture spatio-temporal feature relationships at multiple scales across multiple frames, the MT-STS attention module producing multi-scale spatio-temporal enriched features;
wherein the decoder contains a temporal attention block for enhancing a temporal consistency of transformer queries;
wherein the encoder further contains a deformable attention block that outputs baseline features, the baseline features being fused with the multi-scale spatio-temporal enriched features through a convolution operation to obtain encoder output features; and
displaying the video instance mask sequence.

12. The computer readable storage medium of claim 11, wherein
the MS-STS attention module employs an intra-scale temporal attention block and an inter-scale temporal attention block, further comprising:

operating, via the intra-scale temporal attention block, on each spatial scale across the multiple frames to produce temporally relevant intermediate features; and learning, via the inter-scale temporal attention block, similarities between the spatial-temporal feature relationships across two neighboring spatial scales using the temporally relevant intermediate features output by the intra-scale temporal attention block.

13. The computer readable storage medium of claim 11, further comprising:

training the video processor circuitry, including improving the spatio-temporal feature relationships using an adversarial loss which enhances foreground-background separability.

14. The computer readable storage medium of claim 11, further comprising:

predicting the sequence of mask instances using the output of the encoder and the temporally consistent transformer queries from the decoder.

15. The computer readable storage medium of claim 11, wherein:

the video image frame sequence includes a sequence of image frames of a road sign of different scales, in motion; further comprising:

capturing, via the multi-scale spatio-temporal split attention module, the spatio-temporal feature relationships at multiple scales across multiple frames that includes the road sign as the vehicle approaches and passes the road sign.

16. The computer readable storage medium of claim 11, wherein the video image frame sequence includes a sequence of image frames of a road sign of different scales, in motion, and at least one pedestrian also at different scales moving in a direction of a crosswalk; further comprising:

capturing, via the multi-scale spatio-temporal split attention module, the spatio-temporal feature relationships at multiple scales across multiple frames that includes the road sign as the vehicle approaches the road sign together with the at least one pedestrian moving toward the crosswalk.

17. The computer readable storage medium of claim 11, wherein the video image frame sequence includes a dynamic scene in which people are moving in random directions in a vicinity of a road which the vehicle is traveling, crossing paths with each other; further comprising:

capturing, via the multi-scale spatio-temporal split attention module, the spatio-temporal feature relationships at multiple scales across multiple frames that includes the moving people as the vehicle approaches the moving people; and tracking the moving people.

18. The computer readable storage medium of claim 11, wherein the video image frame sequence includes a scene containing a location road sign that displays information of a location; further comprising:

capturing, via the multi-scale spatio-temporal split attention module, the spatio-temporal feature relationships at multiple scales across multiple frames that includes the information of the location road sign, under conditions of changing scale of the location road sign, subject to various angles of view and partial view of the location road sign; and recognizing the road sign including the information of the road sign, while the vehicle is moving, under conditions of changing scale of the location road sign, while the vehicle moves relative to the location road sign, and subject to various angles of view and partial view of the location road sign.

19. The computer readable storage medium of claim 11, wherein the video image frame sequence includes a partial scene of a road where the vehicle is traveling that includes a plurality of moving pedestrians entering and leaving the partial scene, at least one cyclist moving at a higher rate of speed relative to the plurality of pedestrians, into the partial scene, and a partial view of a building; further comprising:

capturing, via the multi-scale spatio-temporal split attention module, the spatio-temporal feature relationships at various scales across frames in the video sequence that includes the plurality of pedestrians and the at least one cyclist as the vehicle approaches and passes a section of the road where the pedestrians and the at least one cyclist are approaching to cross; and tracking the moving plurality of pedestrians and at least one cyclist.

20. A method for a vehicle computer vision system, the vehicle computer vision system comprising at least one video camera mounted on a vehicle, and video processor circuitry, the method comprising:

inputting a stream of video data and generating a sequence of image frames;

segmenting and tracking, by the video processor circuitry, object instances in the stream of video data, including receiving the sequence of image frames;

analyzing the sequence of image frames using a video instance segmentation transformer to obtain a video instance mask sequence from the sequence of image frames, having a backbone network, a transformer encoder-decoder, and an instance matching and segmentation block, wherein the encoder contains a multi-scale spatio-temporal split (MS-STS) attention module to capture spatio-temporal feature relationships at multiple scales across multiple frames, the MT-STS attention module producing multi-scale spatio-temporal enriched features;

wherein the decoder contains a temporal attention block for enhancing a temporal consistency of transformer queries;

wherein the encoder further contains a deformable attention block that outputs baseline features, the baseline features being fused with the multi-scale spatio-temporal enriched features through a convolution operation to obtain encoder output features; and displaying the video instance mask sequence.

* * * * *